United States Patent [19]
Corso

[11] Patent Number: 5,486,998
[45] Date of Patent: Jan. 23, 1996

[54] PROCESS STABILIZING PROCESS CONTROLLER

[75] Inventor: Ronald Corso, Indianapolis, Ind.

[73] Assignee: Amax Coal West, Inc., Gillette, Wyo.

[21] Appl. No.: 77,244

[22] Filed: Jun. 14, 1993

[51] Int. Cl.$^6$ .......................... G05B 13/02; G06F 15/18
[52] U.S. Cl. ........................ 364/152; 364/157; 395/20
[58] Field of Search ................................ 364/148, 152, 364/157, 138, 578, 503, 572; 395/11, 20, 23, 21, 906

[56] References Cited

U.S. PATENT DOCUMENTS

| | | | |
|---|---|---|---|
| 4,730,259 | 3/1988 | Gallant | 364/513 |
| 4,811,197 | 3/1989 | Wexler | 364/148 |
| 4,827,395 | 5/1989 | Anders et al. | 364/148 |
| 4,855,674 | 8/1989 | Murate et al. | 364/157 |
| 4,879,643 | 11/1989 | Chakravarty et al. | 364/148 |
| 4,910,684 | 3/1990 | Ostergaard et al. | 364/503 |
| 4,918,620 | 4/1990 | Ulug | 364/513 |
| 4,974,337 | 12/1990 | Tavakoli et al. | 34/27 |
| 5,012,430 | 4/1991 | Sakurai | 364/131 |
| 5,041,976 | 8/1991 | Marko et al. | 364/424.03 |
| 5,089,963 | 2/1992 | Takahashi | 364/424.1 |
| 5,121,467 | 6/1992 | Skeirik | 395/11 |

OTHER PUBLICATIONS

Cal A. Depew et al., "Evaluation of Alternative Control Strategies for Delayed Coker by Dynamic Simulation," pp. 240–246, Date Unknown.

Walter H. Bare et al., "Design of a Self–Tuning Expert Controller for a Gasoline Refinery Catalytic Reformer," pp. 247–253, Date Unknown.

J. Lieslehto, et al., "An Expert System for Tuning PID Controllers," pp. 261–262, Date Unknown.

R. K. Miller and T. C. Walker, "Artificial Intelligence Applications in Engineering," SEAI Technical Publications and the Fairmont Press, Inc., 1988, pp. 269–279, Month Unknown.

G. J. Birky, "Knowledge Representation for Expert Systems in Chemical Process Control Design," UMI Dissertation Services, 1988 pp. 1–5, 172∝204, Month Unknown.

J. C. Hoskins and D. M. Himmelblau, "Artificial Neural Network Models of Knowledge Representation in Chemical Engineering," Comput. Chem. Engng., vol. 12, No. 9/10, pp. 881–889, 1988, Month Unknown.

J. J. Ferrada, M. D. Gordon, I. W. Osborne–Lee, "Application of Neural Networks for Fault Diagnosis and Operations in Plant Production" 1989, Month Unknown.

D. S. Touretzky and G. E. Hinton, "A Distributed Connectionist Production System," Carnegie Mellon University, pp. 1–38, Dec. 1986.

J. Potvin, G. Lapalme, J. Rousseau, "Automatic Selection (List continued on next page.)

*Primary Examiner*—Paul P. Gordon
*Attorney, Agent, or Firm*—Sheridan Ross & McIntosh

[57] ABSTRACT

A process controller is disclosed for controlling a process. The process controller includes a process supervisor for accessing process control data clusters from a library. Each data cluster provides control data, e.g., setpoints, deadbands, execution frequencies and alarm ranges for process actuator controllers. Each actuator controller maintains a related process attribute within a deadband by controlling at least one process actuator. Data clusters for the library are provided in substantially real-time by a learning unit. Data continuously output from process related sensors are transformed and supplied to the learning unit as training data for learning at least one relationship between process control data and data for at least one substantially uncontrollable process influencing factor (e.g., processing site environmental factors such as temperature and barometric pressure). Prior to inserting a newly provided data cluster into the library, the data cluster is evaluated for predicted successful performance when accessed by the supervisor. Data clusters are also evaluated after each use by the supervisor, with non-performing clusters becoming inaccessible for further use. The supervisor can also fine tune or adjust control data to more closely fit the present behavior of the process. The process controller is embodied in controlling a coal drying process using a combustion gas heat transfer technique.

71 Claims, 21 Drawing Sheets

OTHER PUBLICATIONS and Design of Efficient Vehicle Routing Algorithms," Universite de Montreal, pp., 523–527, 1989, Month Unknown.

C. Batur and V. Kasparian, "Application of Self Tuner Using Fuzzy Control Techniques," University of Akron, pp. 235–244, 1989, Month Unknown.

B. Burg, D. Luzeaux, B. Zavidovique, "CANDIDE: A Learning System for Process Control," Japan, pp. 270–277, 1989, Month Unknown.

N. R. Shadbolt, B. D. Robinson, R. K. Stobart, "Knowledge Representation for Closed Loop Control," United Kingdom, pp. 296–304, 1989, Month Unknown.

M. E. Ulug, "A Hybrid Expert System Combining AI Techniques With a Neural–Net," GE Research and Development Center, pp. 305–309, 1989, Month Unknown.

G. Wagenaar and L. M. Schrijnen, "Autopes, The Development of a Knowledge Based System for Process Control," Netherlands Organization for Applied Scientific Research (TNO), pp. 59–65, 1988, Month Unknown.

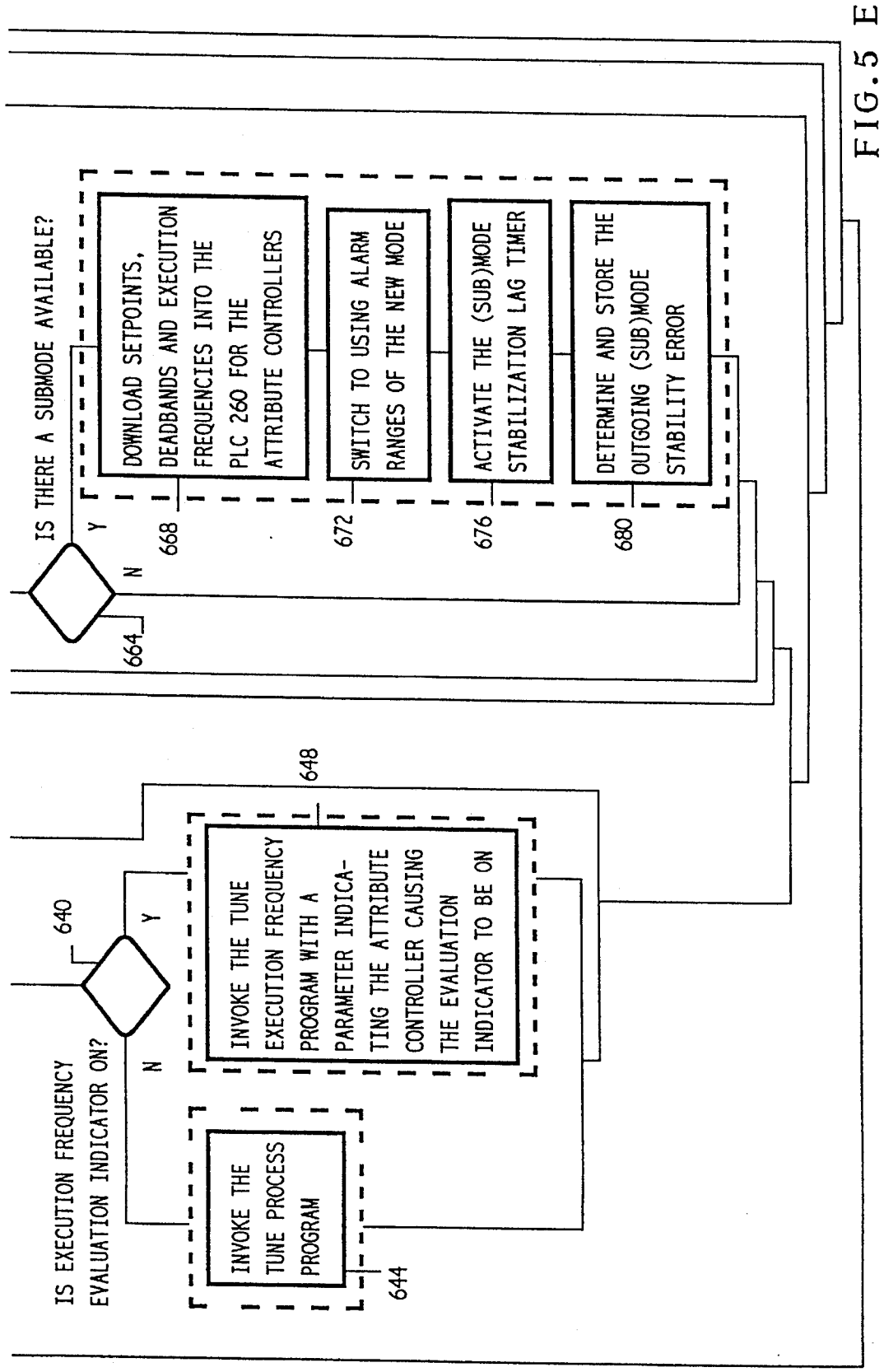

PROCESS STABILIZING PROCESS CONTROLLER

FIELD OF THE INVENTION

The present invention relates to a process controller for controlling a process for producing a product. The invention includes a controlling unit with explicitly encoded process stabilization rules and a learning unit for learning how process control data effects product quality under a plurality of environmental operating conditions, such as the weather. Data corresponding to the learned relationships is captured in a library to be used by the controlling unit for assisting in controlling the process. The process controller is particularly useful in controlling processes where process instability can be dangerous. In particular, the process controller is useful in controlling a coal drying process.

BACKGROUND OF THE INVENTION

Automated process controllers have been developed to control a substantial number of production processes. However, heretofore these process controllers have had difficulty in adequately stabilizing certain processes when high production rates and/or high product quality are required. In particular, current process controllers are progressively less adequate as the process has more of the following characteristics: inherently unstable, must be exceedingly stable, inherently dangerous when unstable, requires tightly coupled coordination of a substantial number of process actuators, influenced by a number of substantially uncontrollable factors, requires stringent timing and/or substance composition constraints and cannot be effectively continuously directed by a human operator(s). For example, current process controllers such as a commercially available computer driven programmable logic controller (PLC) can monitor and control, in real time, a large number of process actuators and sensors. However, there are at least two noteworthy drawbacks:

(1.1) the process control exhibited by a PLC is low level. That is, there is insufficient coordination among the controllers within the PLC to provide overall process stability. The isolated action of one controller may adversely affect other process reactions, thus resulting in other PLC controllers taking inappropriate responses;

(1.2) a PLC has either insufficient or no means of adapting to or learning the peculiarities of a specific processing facility. For example, such subtle or indirect process affecting factors as wear and degraded performance of process equipment cannot be sufficiently taken into account.

A particularly challenging process, having substantially all the above characteristics, is the typical coal drying process. Coal drying is a complex process typically using a rapid heat transfer technique to remove water from coal. Commercial coal drying techniques rapidly heat one to four tons of coal to 200°–210° F. using combustion exhaust gas to vaporize any water residing in the coal. In controlling such a real time process involving an energy transfer to a substance (e.g., coal) for changing a property of the substance, it is desirable to stabilize the process such that there are not substantial oscillations in the reactions within the process. By stabilizing the process appropriately, a consistently high quality, cost effective product can be obtained. Alternatively, substantial instability can result in significant damage to both property and personnel. For example, the optimal free oxygen gas content of a coal drying chamber is approximately 4%. However, if the free oxygen gas content exceeds 7%, the coal being dried is likely to explode. Further, under certain conditions, seemingly small fluctuations in process control parameters can cause exhaust gas emissions to exceed environmental regulations. Thus, even small variations in the content of the coal drying gas must be detected and acted upon quickly and properly.

It is known to utilize a high level process control supervisor procedure to control a PLC. In U.S. Pat. No. 5,006,992, issued to Richard D. Skeirik, a process control system is disclosed having a high level supervisor procedure that is modular such that the modules can be easily revised without significant interruption in the operation of the process supervisor. The supervisor can also call on various expert subsystems to which it is linked to provide expert knowledge in controlling various aspects of the process.

It is also known to use a learning system for diagnosing and/or controlling a process. Such features are disclosed in U.S. Pat. No. 4,730,259 and U.S. Pat. No. 5,089,963.

In the '259 patent, issued to Stephen I. Gallant, an expert system architecture is disclosed for use in diagnostic and/or process control systems. The expert system includes an inference engine which uses a "matrix of learning coefficients" (i.e., a neural net) as the knowledge base representation from which inferences are made. Further, the matrix can be generated from training examples and, optionally, user inserted rules. The matrix can also be dynamically modified as the system operates. The expert system is embodied in the context of a simple disease diagnosis example. No further embodiments are illustrated.

In the '963 patent, issued to Hiroshi Takahashi, an automobile transmission gear shifting control system is disclosed which employs a learning device similar to a neural net for learning how to select one of a predetermined number of gear shifting strategies according to sensor inputs related to driving conditions and the driver's transmission gear shifting pattern preferences. Once sufficient learning has taken place, the control system can subsequently automatically recall and activate the preferred shifting strategy on the basis of the monitored driving parameters and the stored driving patterns.

Regardless, however, of the above prior art and other such process control methods and apparatuses, there is a need for a process controller and process controller architecture for safely and cost effectively stabilizing such difficult processes as coal drying. In particular, it would be advantageous to have such a process controller which provides real time control over the entire process during product processing, substantially without the need for operator control. Moreover, there should be virtually no circumstance where an operator is required to make a snap judgment decision forced by process time critical constraints. Thus, such a novel process controller should be able to safely, automatically and in real time coordinate the adjustment of process control settings in response to sensor input data and automatically execute alternative process control strategies, including emergency shut-downs, whenever the current strategy is deemed ineffective. Moreover, the process controller should be capable of continually adapting or learning how process equipment and environmental factors affect the process and the resulting product. Thus, when there is a large number of process related factors that are related to one another and to the characteristics (i.e., quality and/or quantity) of the resulting product in complex, variable and oftentimes processing site specific ways, the process controller should be capable of continually adapting to such relationships in a safe and cost effective manner.

SUMMARY OF THE INVENTION

It is an objective of the present invention to provide a process controller for maintaining the stability, safety and effectiveness of a process at a predetermined process facility. The novel process controller provides these advantages by having an architecture suitable for application to various processes and process facilities. The functionality of the process controller is advantageously architected:

(2.1) to address the difficulties encountered in controlling a process where there is insufficient knowledge explicitly encoded within the process controller of process impacting dynamics or factors for predictably controlling the process; and (2.2) to substantially separate low level process specific actuator control functionality from more high level process control functions regarding process stability, safety and effectiveness.

It is a further objective of the present invention to provide a process controller for safely and effectively stabilizing a process where unstable behavior cannot be tolerated. In particular, with regard to a heat transfer process to a volatile substance.

It is a further objective of the present invention to substantially dampen or diminish process destabilizing actions by low level actuator controllers, equivalently denoted herein as attribute controllers. Such actuator controllers act substantially independently, whereby each such controller typically controls a predetermined attribute of the process. In doing so, each of these attribute controllers may direct one or more process actuators. Thus, a process actuator can be directed by more than one attribute controller. Thus, when provided with certain combinations of process control settings, the attribute controllers can over control a process, thereby causing unnecessary fluctuations in the process. In particular, such attribute controllers can produce a behavior known as "hunting" in the art whereby the attribute controllers output a series of process destabilizing actuator commands when over controlling. Hunting is oftentimes induced when the attribute controllers are instructed to maintain the process at prescribed setpoints and within prescribed deadbands where the process is unstable. Relatedly, process fluctuations occur when a plurality of attribute controllers produce competing or conflicting actuator commands in order for each attribute controller to maintain the process in its assigned deadband.

It is a further objective of the present invention to substantially automate the process facility operation such that an operator is not required to make time critical decisions, possibly endangering both personnel and the process facility. In particular, it is an objective of the present invention to fully automate process alarm handling such that operator input is not required.

To accomplish the above objectives, the process controller of the present invention includes a controlling unit for controlling the process facility and a learning unit for adapting the controlling unit to the peculiarities of the process facility. The controlling unit includes a supervising unit having explicitly encoded rules related to safely and effectively stabilizing the process. In addition, the controlling unit includes an actuator control unit (e.g., a PLC), subordinate to the supervising unit and of a type well known in the art. The actuator control unit, in turn, contains the attribute controllers. The supervising unit contains decision making logic for supplying the attribute controllers with process control data (e.g., setpoints, deadbands and attribute controller execution frequencies) in a manner substantially invariant of the process being controlled. In supplying the process control data, the supervising unit uses feedback from the actuator control unit regarding process stability. The feedback is used to modify or tune the process control data used by the attribute controllers so that the operation of the process facility remains substantially stable. In accomplishing this tuning, the supervising unit includes decision logic relating to at least one of the following types:

(3.1) decision logic directed toward shifting values in the process control data output by the supervising unit and used by the attribute controllers in determining how to direct the process actuators. That is, the decision logic here attempts to shift the process control data values, such as the setpoints and deadbands, for each of one or more attribute controllers such that these values more closely reflect how the process is currently behaving; and (3.2) decision logic directed toward modifying the execution frequency of one or more attribute controllers. By changing the relative frequency by which one attribute controller executes in comparison to another, destabilizing conflicts between the attribute controllers can be dampened.

In addition, the supervising unit is tailored to both stabilize the process and insure sufficient output product quality by receiving process performance data derived from output obtained from the learning unit. In order to provide the process performance data, the learning unit is supplied by the controlling unit with process related data, used or obtained during processing, upon which the learning unit is trained such that relationships between various process influencing dynamics or factors can be learned. In particular, insufficiently understood process influencing factors such as environmental factors or wear on process facility equipment can be related by the learning unit to output product characteristics such as product quality and/or quantity measurements. Thus, since substantially all process specific knowledge for controlling the process under non-alarm conditions is either explicitly encoded in the subordinate actuator control unit or provided as process performance data output from the learning unit (once sufficient training has occurred), the non-alarm process tuning capabilities of the supervising unit can be used in controlling numerous processes and/or process facility sites.

A process alarm is activated to indicate an abnormal, improper or dangerous condition. The supervising unit has separate decision logic for handling alarms in a manner specific to the process being controlled. In particular, there are distinct supervising unit submodules for handling "external alarms" (i.e., alarms activated or detected by the actuator control unit) and "internal alarms" (i.e., alarms activated within the supervising unit). With regard to internal alarms, the supervising unit contains a submodule for activating internal alarms based on an analysis of data supplied by the actuator control unit (e.g., internal alarms based on processing trends deviating from historical data patterns). Thus, the architecture of the supervising unit is modularized in a manner allowing it to be easily applied to various control processing applications. Further, once the architecture of the present invention is tailored to a specific process facility, the resulting process controller can be used, substantially unchanged, to control the same type of process at a different process facility site by retraining the learning unit on process data from the new facility.

As part of the mechanism for supplying process performance data output by the learning unit to the supervising unit, the present invention also includes filters for preventing process performance data suspected of potentially yielding unacceptable process performance from being used by the supervising unit. To describe the filters, a brief discussion of the process performance data is needful.

Process performance data is supplied to the supervising unit in clusters of related data known as "process performance data clusters" or equivalently "data clusters." Each data cluster includes process control data (e.g., attribute controller setpoints, deadbands, execution frequencies and/or alarm data) for controlling the process. More specifically, each data cluster includes data relating to a particular "operational context." Each operational context includes:

(4.1) processing configuration information indicating what pieces of processing equipment are expected to be in use and the substantially static operating characteristics for the equipment. Such configurations can coincide with various states of process facility operation such as start-up, shut-down, maintenance and various process operation states;

(4.2) performance target values that are substantially unchangeable for a given process state and the output product expected. Such values include certain control data target values critical to process control and/or output product target characteristics. Thus, for example, during process operation, there are likely to be target ranges for output product characteristics related to product quality and/or quantity;

(4.3) process control data for controlling the process. This data includes attribute controller setpoints, deadbands, execution frequencies and alarm ranges. Thus, for example, when a process attribute measurement from a process sensor is outside a predetermined deadband range, then a predetermined attribute controller, which governs the process attribute, uses the deadband and/or a related setpoint in determining how to adjust the process so that the process attribute is within the deadband;

(4.4) predetermined process applicability data, i.e., data used for specifying when the data cluster's process control data (4.3) is relevant to controlling the process. Such applicability data includes data related to a number of process factors that influence the process and/or the output product characteristics. In particular, substantially uncontrollable process influencing factors are included. For example, the composition of an input material to the process or the ambient weather conditions can be substantially uncontrollable yet influential for many processes. Thus, for instance, if the composition of the input material to the process can be measured, then the applicability data can include a range of values for the composition of the input material as part of the criteria for determining the applicability of the related process control data of (4.3).

Each such process performance data cluster is designated as either a "mode" or a "submode." Each mode relates to an operational context having relatively lax applicability data (4.4) constraints. Moreover, the related process control data (4.3) for a mode includes values that are expected to be sufficient for controlling the process while maintaining the processing configuration consistent with the related data of (4.1) and (4.2). However, the mode's process control data typically is not optimal for cost effective processing. Further, a different mode is used to control the process whenever the processing facility enters a new operational context having either (4.1) or (4.2) different from any immediately preceding operational context. That is, a new mode is accessed by the supervising unit which, in turn, uses the process control (4.3) data in the new mode to determine the process control data to be provided to the actuator control unit.

Each submode is related to a unique mode such that the submode's related operational context has (4.1) and (4.2) identical to the operational context of the related mode while the data of (4.3) and (4.4) are typically more restrictive than the related mode. Thus, the intention of the relationship between a mode and its submode(s) is that each submode provides process control data that yields more cost effective processing than the related mode when the applicability data (4.4) of the submode is satisfied. Thus, during process facility operation, as processing conditions change or more cost effective processing is desired, a submode both related to the last mode accessed by the supervising unit and expected to better satisfy the present operational context will be supplied to the supervising unit. This submode will be used in place of the currently accessed (sub)mode. Thus, the last mode supplied to the supervising unit, hereinafter referred to as the "active mode," determines all subsequent submodes supplied. Thus, in general, each submode contains data relating to (4.3) and (4.4) that is more narrow or limiting than that in the related mode. Moreover, the data within a submode relating to the process control data of (4.3) of its operational context can be considered to be a refinement of the process control data (4.3) of the related mode.

Returning now to the process performance data filters, there are filters applied to submode data both before it becomes accessible by the supervising unit and after it is used by the supervising unit. With regard to the pre-use filter, that is, the filter applied prior to the submode being accessible by the supervising unit, a confidence prediction factor is determined for the submode. A first predetermined threshold is used to compare with the confidence prediction factor to determine if the submode is to be accessible for use by the supervising unit. All accessible submodes, as well as modes, are stored in a "mode library" which has the capability of providing the supervising unit with the "most appropriate" mode or submode (i.e., the data cluster that most closely fits the current applicability data values of (4.4)) as will be discussed in the detailed description below.

With regard to the post use filter, that is, the filter applied subsequent to a submode being accessed by the supervising unit, an error stability measurement is determined after the supervising unit relinquishes use of the submode. A second predetermined threshold is used to compare with this error stability measurement to determine if the submode should be replaced or removed from the mode library due to the inadequate performance.

In supplying modes and, in particular, submodes, to the supervising unit, the mode library provides an indexing scheme for the data clusters so that (sub)modes are retrieved efficiently. Further, to provide the "most appropriate" (sub)mode to the supervising unit, the mode library also includes an access module which automatically determines the (sub)mode that most closely fits current processing needs.

The creation of data clusters (i.e., submodes) from process performance data output by the learning unit is accomplished by a submode generator/filter. Although the learning unit uses sensor and control data logged during process facility operation to learn the more subtle and changeable process impacting factors, it should be noted that the technology for such a learning unit does not guarantee infallibility. In particular, the percentage of correct responses by a learning unit depends on the degree of training and on how closely the training data relates to the requested output from the learning unit. Thus, the submode generator/filter is used in automatically analyzing the output of the learning unit to determine which outputs are to be used in generating a submode. More precisely, the submode generator/filter determines:

(5.1) whether a learning unit output is likely to generate a "reasonable" submode. That is, whether the submode is likely to cause the processing facility to perform at a minimally acceptable level, and in addition, whether the submode is likely to perform at least as well as any submode it may replace in the mode library;

(5.2) whether the submode's process control data are sufficiently distinct from other submodes, related to the same mode, such that it is worthwhile to include the submode in the mode library.

Relatedly, it is worthwhile to mention that the mode library and the submode generator/filter cooperate to filter from the mode library any non-performing submodes periodically during process operation. In one current embodiment, such filtering occurs in 0.5 to 2 hour intervals during product processing (although shorter or longer intervals are possible).

The new process controller is presently embodied in a novel process controller for drying coal. The controlling unit of the new coal drying process controller has a supervising unit that includes a real time rule based expert system. The expert system contains a collection of parameterized rules for stabilizing, via a commercially available PLC as the actuator control unit, the rapid high intensity transfer of heat to large quantities of coal in order to vaporize moisture residing in the coal thereby reducing the coal's moisture content. The parameterized rules are supplied both with process measurement values, via the actuator control unit, and with modes and submodes from the mode library. The actuator control unit supplies process measurement values relating to the degree of stability of the coal drying process. The mode library supplies an appropriate mode or submode having process control data for stabilizing the process and/or enhancing product quality. In this embodiment, the appropriate mode or submode is determined by an operational context including: (a) the performance target values of (4.2) comprising the dried coal output tonnage rate (tons per hour) and the percent by weight of moisture remaining in the dried coal; and (b) the (substantially uncontrollable) process influencing factors of (4.4) comprising the percentage of moisture in the coal to be dried, as well as the process facility ambient air temperature, windspeed and wind direction.

With regard to the learning unit of the coal drying process controller, this unit includes a neural net learning module. The learning unit receives input training data from the controlling unit and subsequently, once sufficient training has occurred, outputs process performance data (i.e., data for generating submodes) to be used by the controlling unit.

Furthermore, it should be noted that the coal drying process controller is substantially automatic in operation. That is, during much of the coal drying process, the process operator is preferably forbidden from closely controlling the coal drying process. That is, the coal drying facility can be directed to enter an automatic state whereby substantially all process stabilization is accomplished automatically.

In addition to the advantages of this new process controller that have been mentioned above, the following advantages are also noteworthy.

It is an advantage of this invention to provide both explicit control, via a supervising unit having expert system rules, over well understood critical process dynamics and to provide a more implicit cost effective control, via a learning unit, over other process dynamics where these dynamics are transient and/or individually may not be sufficiently critical to require substantial analysis.

It is a further advantage of this invention to provide a relatively simple supervising unit to stabilize the coal drying process by using a learning unit to tailor expert system rules within the supervising unit to the complexities of a specific process facility site.

It is a further advantage of this invention to filter process performance data output by the learning unit to ensure that the supervising unit accesses only the process performance data clusters with acceptable expected performance.

It is a further advantage of this invention to reduce experimentation in determining acceptable process control setpoints and deadbands by the use of a learning unit.

It is a further advantage of this invention to provide frequent automatic adjustments of process control settings as the process dynamics change.

It is a further advantage of this invention to fully automate process alarm handling whereby an operator response to any alarm is not required for safely controlling the process.

Other features and advantages of the present invention will become apparent from the detailed description and the accompanying figures contained hereinafter.

BRIEF DESCRIPTION OF THE DRAWINGS

FIGS. 5A–5E are high level flow charts illustrating the actions of the supervisor 262 when controlling a coal drying process.

DETAILED DESCRIPTION OF THE INVENTION

Figure 1A:
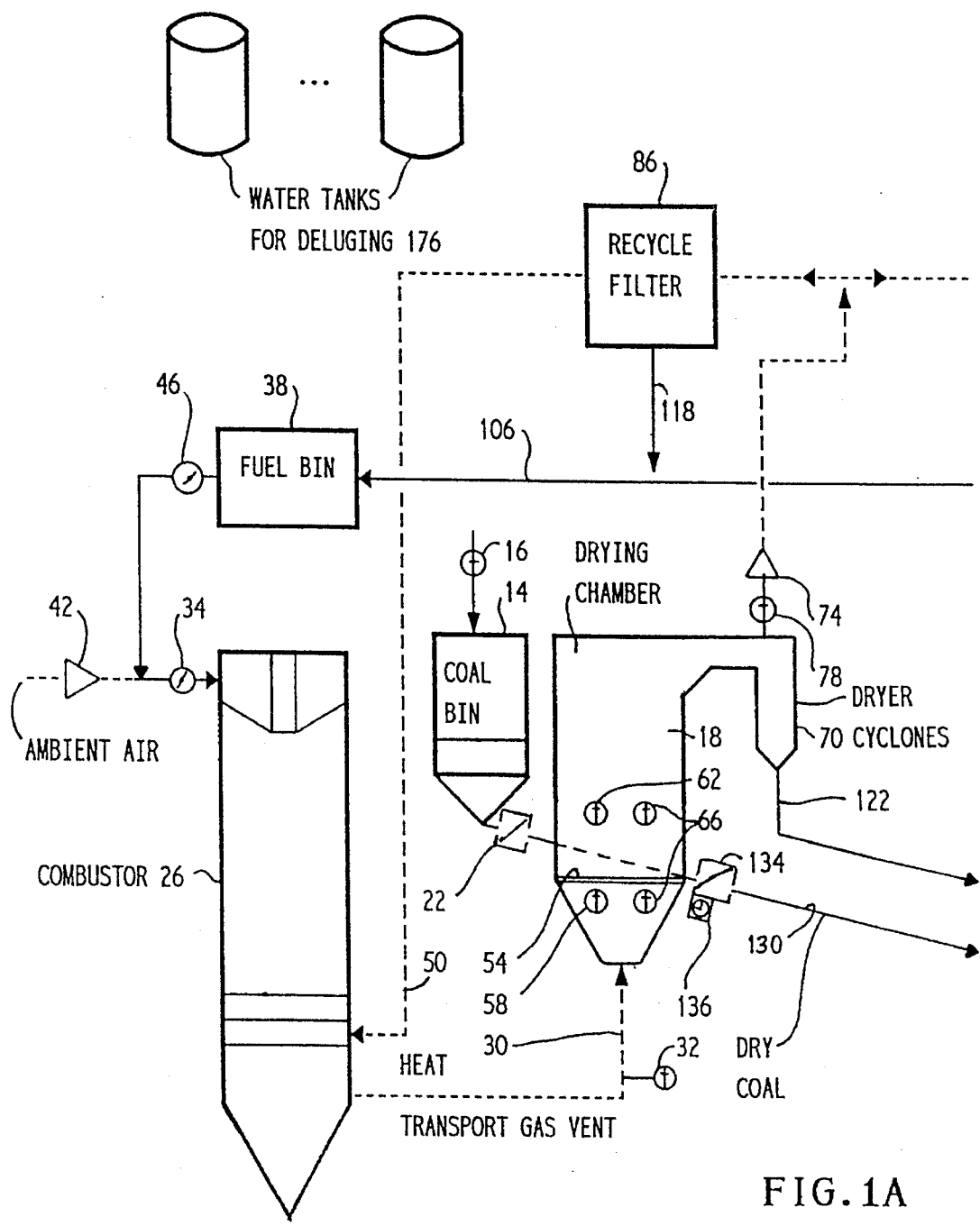
FIGS. 1A–1B are diagrams of a coal drying facility which is controlled by one embodiment of the present invention.
Figure 1B:
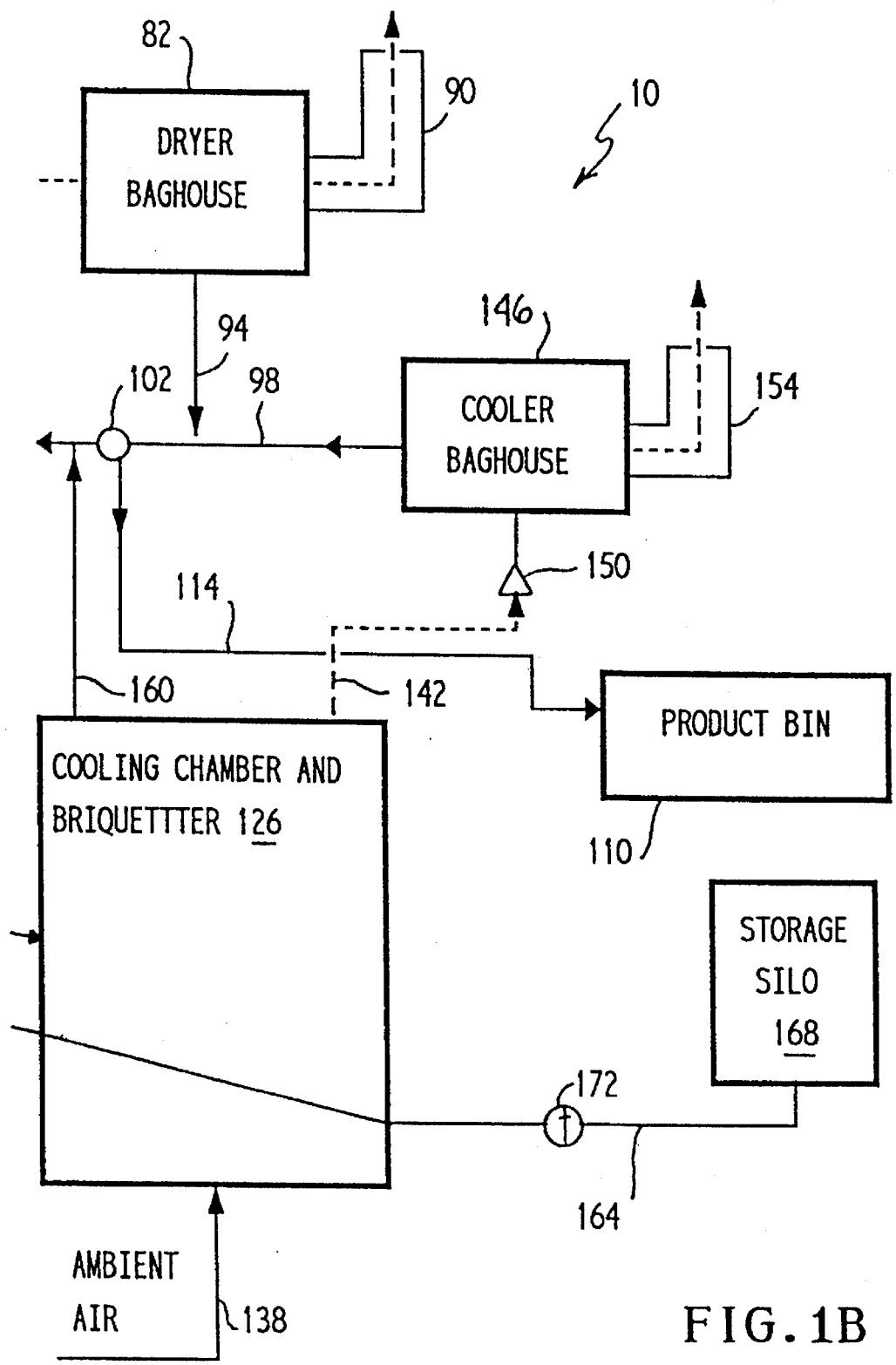

Referring to FIGS. 1A–1B, diagrams of the coal drying facility 10 embodying the present invention is disclosed. The coal bin 14 contains coal to be dried. Attached to the coal input supply to the coal bin is a moisture sensor 16 for determining the moisture of the coal to be dried. The coal bin 14 provides coal to the drying chamber 18 where the coal is heated and dried. The rate at which coal enters the drying chamber 18 (i.e., tons per hour) is monitored and controlled by a coal feeder 22. The drying chamber 18 is connected to a combustor 26 via a heat transport gas vent 30. The combustor 26 burns a fuel/air mixture to produce a heated exhaust gas that is vented into the drying chamber 18 as a heat transport gas. The fuel/air mixture is monitored and controlled by the combustion air fan damper 34. The combustion air fan damper 34, in turn, receives the fuel/air mixture from the mixing of fuel, stored in the fuel bin 38, with ambient air, the mixture being urged through the combustion air fan damper 34 via the fan 42. Note that there is a fuel feed rate controller 46 for monitoring and controlling the flow of fuel from the fuel bin 38 to the combustor 26. In addition, previously expelled heat transport gas is recycled back into the combustor 26 via the heat transport gas conduit 50 for recycling heat. During combustion, the newly heated heat transport gas is subsequently expelled from the combustor 26 into the heat transport gas vent 30. Since the free oxygen content of the heat transport gas must remain in a range of 3–7% for safety and efficiency, attached to the vent is a plurality of oxygen sensors 32 for monitoring and controlling the free oxygen content.

Returning now to the drying chamber 18, within the drying chamber 18 is a perforated grate or deck 54 above which the coal resides during drying. The heat transport gas, via vent 30, enters the drying chamber 18 below deck 54 and is forced under pressure through the deck 54 perforations and subsequently through the coal being dried. Also within the drying chamber 18 is a plurality of sensors to monitor the conditions within the drying chamber. In particular, there is a plurality of temperature sensors 58 below the deck 54 providing a process control system 200 (see FIG. 2) with below deck temperature readings. There is also a plurality of temperature sensors 62 above the deck 54 providing the process control system 200 with above deck temperature readings. Both the above and below deck temperature readings are used by a drying chamber temperature attribute controller (not shown). Further, there is also a plurality of pressure differential sensors 66 for outputting to a deck pressure differential attribute controller (also not shown) the pressure drop from below deck 54 to above the coal being dried. Attached to the drying chamber 18 is a plurality of dryer cyclones 70. Once the heat transfer gas has passed through the coal in the drying chamber 18, it exits into the dryer cyclones 70 bearing a substantial amount of moisture and coal particles. In the dryer cyclones 70, the larger coal particles (i.e., greater than ⅛ of an inch in diameter) are separated from the heat transport gas stream. The heat transport gas is drawn out of the dryer cyclones 70 by the fan 74. There is an exhaust fan temperature sensor 78 for outputting to an exhaust fan temperature attribute controller (not shown) the temperature of the exhaust gas exiting the drying cyclones 70. The fan 74 urges the heat transport gas toward both the dryer baghouse 82 and the recycle filter 86. The portion of the coal-dust-ladened heat transport gas that enters the dryer baghouse 82 is cleansed of coal dust and vented into the atmosphere via dryer stack 90. The dryer baghouse 82 is also connected to a coal dust conveyor 94 for removing coal dust from the baghouse. The conveyor 94, in turn, deposits the dust onto a second coal dust conveyor 98. The dust on conveyor 98 is routed at the fuel transport junction 102 to either the fuel bin 38, via conveyor 106, or the product bin 110 via conveyor 114 for storage until it is transported to customers. The portion of the heat transport gas not vented through the baghouse 82 is diverted through the recycle filter 86 for cleansing of coal dust prior to being recycled back through the combustor 26 via conduit 50. There is also a coal dust conveyor 118 connected to the recycle filter 86 for removing coal dust from the recycle filter 86 and depositing the dust onto the conveyor 106 for transfer to the coal bin 38.

Returning now to the dryer cyclones 70, in addition to the vent for the fan 74, there are dryer cyclone underflows 122 for conveying the larger coal pieces, separated from the heat transport gas, into a cooling chamber and briquetter 126 to be both cooled and agglomerated. Note that the coal in the drying chamber 18 that is not suspended in the heat transport gas is also conveyed, via conveyor 130, into the cooling chamber and briquetter 126 to also be cooled and agglomerated. Further note that there is a coal exit gate 134 which either allows or prohibits coal from exiting the drying chamber 18 onto conveyor 130. The exit gate 134 is monitored and controlled by a gate timer 136 which is, in turn, controlled by the process control system 200. Ambient air is circulated through the cooling chamber and briquetter 126 via inlet 138 and outlet 142. The exhaust gas in outlet 142 is urged into the cooler baghouse 146 via fan 150. Functioning in a manner similar to the dryer baghouse 82, the cooler baghouse 146 filters coal dust from the exhaust gas. The cleansed exhaust gas is then expelled into the atmosphere via cooler stack 154. The filtered coal dust is subsequently removed from the cooler baghouse 146 via conveyor 98 and ultimately is deposited in either the coal bin 38 or the product bin 110.

Returning to the cooling chamber and briquetter 126, coal particles that separate from the larger coal pieces here may also be optionally transferred to the fuel bin 38 via conveyor 160. However, the bulk of the dried coal is transported via conveyor 164 to the dry coal storage silos 168 to be stored until transported to customers. Note that a moisture sensor 172 monitors the moisture content of the dried coal as it proceeds along conveyor 164.

Finally, note that, due to the volatility of the coal drying process, there are a plurality of water tanks 176 provided about the processing site for deluging all or various portions of the coal drying facility 10 in case of emergency.

Figure 2:
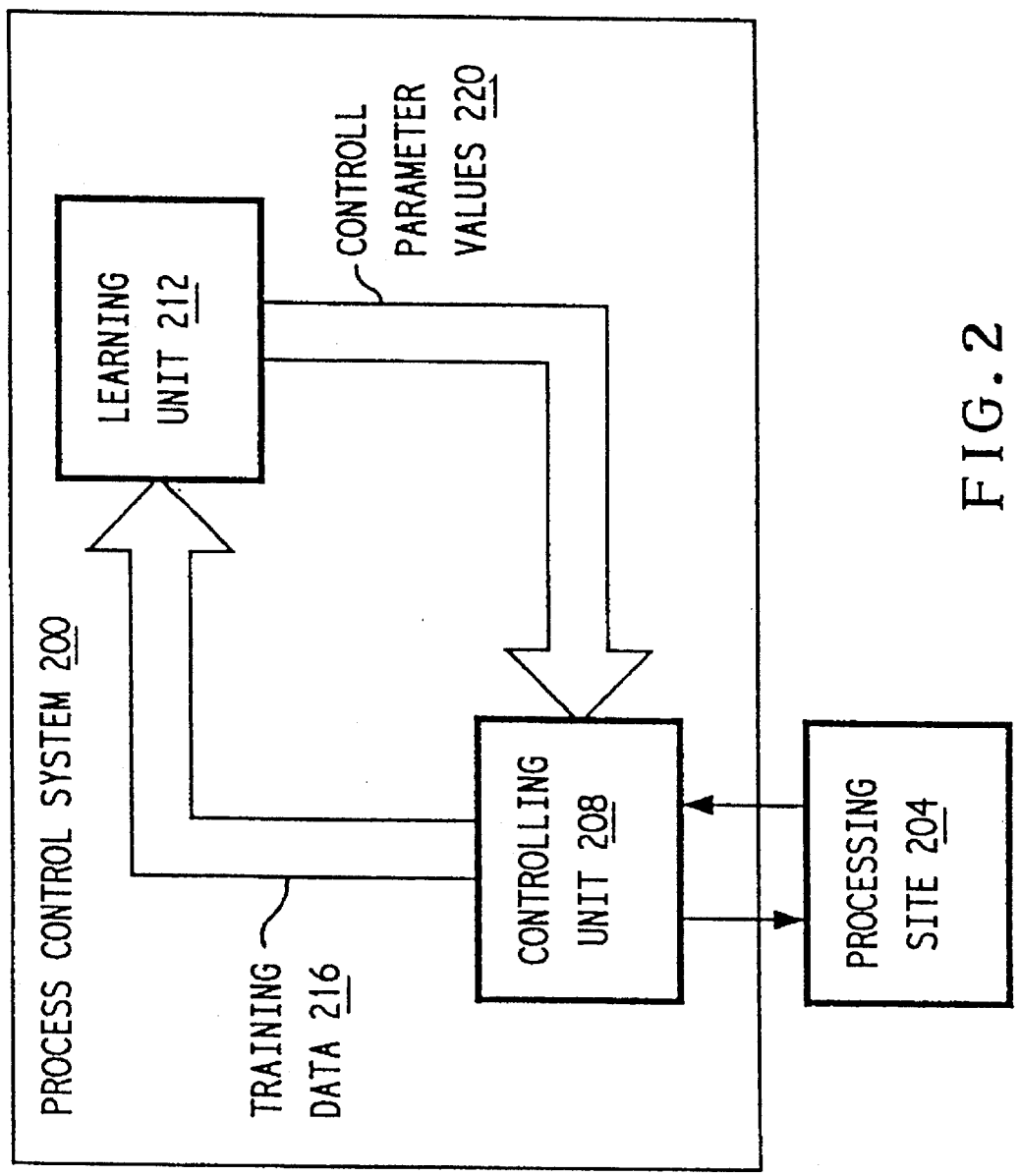
FIG. 2 is a high level block diagram of the architecture of the process controller of the present invention.

In FIG. 2, a block diagram is presented showing the high level architecture of the process control system 200 of the present invention as it would apply to controlling a particular processing site 204 such as, for example, a specific coal drying facility 10. The processing site 204 supplies sensor data to the controlling unit 208 which, in turn, supplies control feedback signals to the processing site 204. The controlling unit 208 preferably contains the process related rules and logic to control the process at the processing site 204. Thus, the controlling unit 208 is substantially responsible for monitoring and controlling the processing site 204.

In addition, the controlling unit 208 is also connected to a learning unit 212 via the data channels 216, 220. The data channel 216 transfers processing site 204 sensor readings, process control data and data regarding output product characteristics to the learning unit 212 as training data. This training data is used to train the learning unit 212 to learn the processing site 204 specific relationships between process control data and the processing site 204 product output characteristics. The data channel 220 provides the controlling unit 208 with the process control data which are specific to the processing site 204 and the desired product output characteristics. Thus, since preferably the process control rules and logic encoded in the controlling unit 208 are parameterized, the learning unit 212 supplies the process control data that tailor the process control rules and/or dynamics to the processing site 204 and the desired product output characteristics.

Figure 3A:
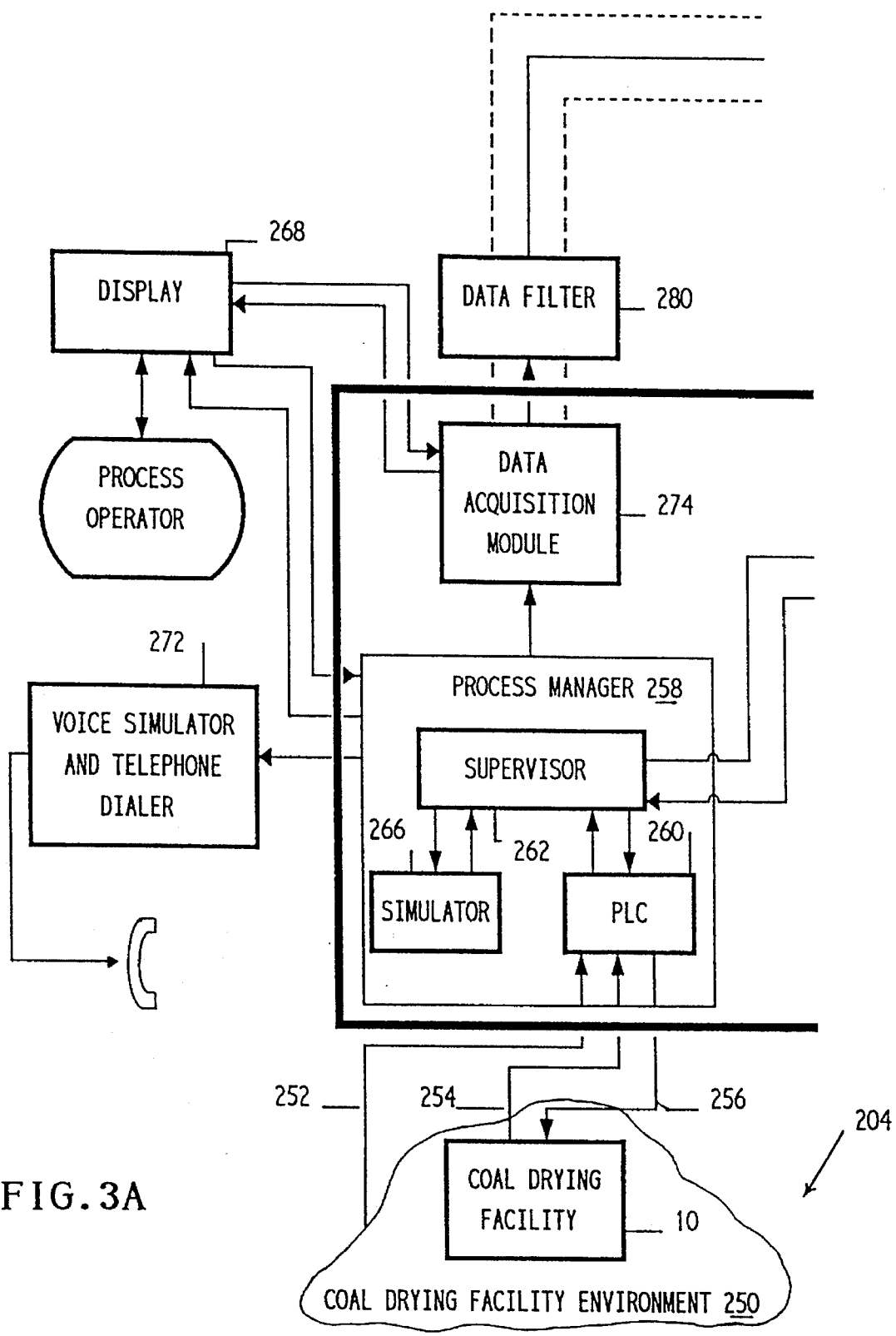
FIGS. 3A–3B are more detailed block diagrams of the process controller of the present invention as it relates to a coal drying facility.
Figure 3B:
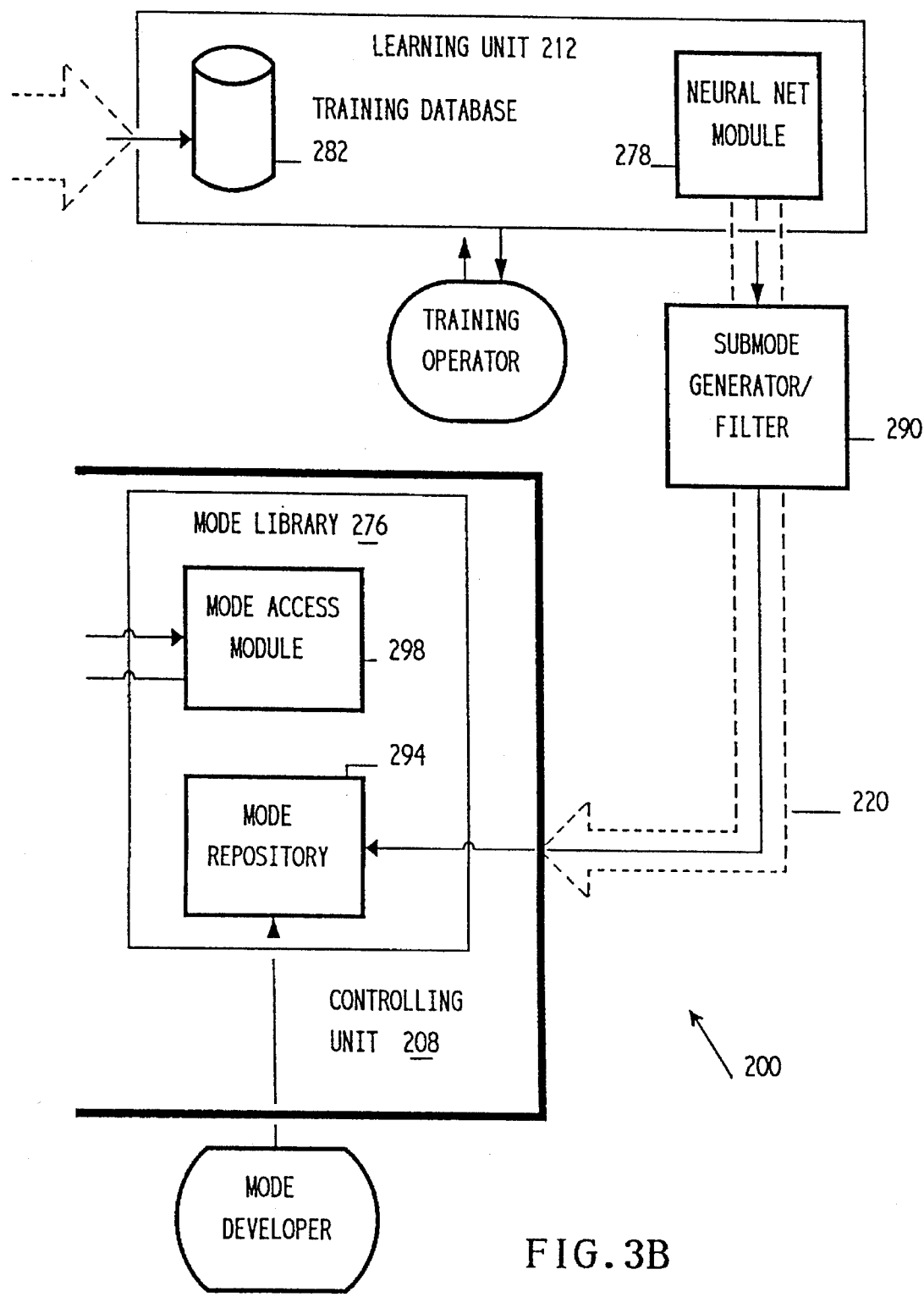

Referring now to FIGS. 3A–3B, and equating like numbered entities in FIGS. 1A–1B, 2 and 3A–3B, a more detailed process control block diagram is presented, illustrating the architecture of FIG. 2 in the context of a coal drying facility as in FIGS. 1A–1B. Thus, the processing site 204 includes a coal drying facility 10 situated in a particular location having a coal drying facility environment 250. Data is transferred between the processing site 204 and the controlling unit 208 via: (a) the external sensor channel(s) 252 whereby, for example, weather data is received by the controlling unit; (b) the coal drying facility sensor channel(s) 254 whereby data relating to conditions within the coal drying facility 10 are received by the controlling unit; and (c) the control signal channel(s) 256 whereby the coal drying facility 10 process actuators receive regulating data from the controlling unit 208. Within the controlling unit 208 there is a real time process manager 258 for managing the coal drying process. The process manager 258 includes a PLC 260 having a plurality of attribute controllers (not shown) for receiving sensor data and product characteristic data from the channels 252, 254 and subsequently outputting low level process actuator control signals via channel(s) 256. The process manager 258 also includes a supervisor 262 for providing the high level coal drying process stabilization and product acceptability. As described in more detail with reference to FIGS. 5A–5E, 6A–6B, 7A–7B and 8A–8B, the supervisor 262 is embodied as a real time rule based expert system containing both logic substantially independent of the coal drying process for supplying the PLC 260 with data for controlling the coal drying process, and logic for handling all process alarms. In particular, as will be described in greater detail with reference to FIGS. 5A–5E, 6A–6B, 7A–7B and 8A–8B, the supervisor 262 includes decision logic for the following types of process control adjustments:

(6.1) the shifting of one or more "operating windows" where each such operating window includes both the setpoint and the deadband for a given attribute controller. That is, each such shift of an operating window moves the included setpoint closer to a measured value indicative of where the process is currently operating. In addition, the related deadband is also shifted by the same amount;

(6.2) the adjusting of the execution frequency of one or more attribute controllers;

(6.3) the use of an entirely new collection of process control data, via a newly accessed submode, such that new setpoints and deadbands can be downloaded into the attribute controllers in the PLC 260.

Thus, the supervisor 262 receives sensor data (e.g., windspeed), alarm data (e.g., data indicating the free oxygen concentration in the heat transport gas is too high), and product characteristic data (e.g., the moisture content of the dried coal) from the PLC 260 and, in return, provides process control data signals required by the attribute controllers in the PLC 260 for controlling the coal drying process and assuring a proper moisture content in the dried coal.

The process manager 258 also includes a coal drying simulator 266 for simulating the behavior of the PLC 260 and the processing site 204 in various operating conditions. Thus, the simulator 266 can supply the supervisor 262 with input simulating output provided by the PLC 260. For example, the simulator 266 can output simulated process reactions in response to control signals received from the supervisor 262. The simulator 266, therefore, allows modifications to various portions of the process control system 200 to be tested prior to actual implementation of the modifications to the coal drying process.

The process manager 258 is also in substantially constant communication with a human process operator via the process operator display 268. The process operator is instrumental in inputting coal drying process characteristics such as the number of tons of coal to be processed per hour and the percentage of moisture tolerated in the dried coal. In addition, the tasks of the process operator include monitoring and responding to alarms (within a predetermined time prior to an automatic response by the supervisor 262) generated by the supervisor and/or the PLC 260. However, it should be noted that beyond these tasks, once the supervisor 262 has taken control of the coal drying process, the process operator can typically only initiate analysis of logged process data, the printing of reports and the shutdown of the coal drying process. In fact, it is not required for the process operator to be present, as will be discussed below. It should be noted, however, that at least in such cases where the process operator is not available to respond to a severe process control alarm(s), the process manager 258 can automatically access voice simulator and telephone dialer 272 to automatically telephone predetermined personnel with a recorded voice message describing the nature of the alarm(s).

The control unit 208 also includes a data acquisition module 274. This module captures process data from the process manager 258 for analysis, reporting and training of the learning unit 212. Thus, the process operator can interact with the data acquisition module 274, via the process operator display 268, to query various databases within the data acquisition module for captured information such as process sensor data, operator message data, alarm data, process control data, and training data.

Additionally, the control unit 208 also includes a mode library 276 which serves as a repository for process performance data clusters (i.e., modes and submodes) having process control data (e.g., setpoints, deadband ranges and alarm ranges) used in both the logic of the supervisor 262 and the attribute controllers of the PLC 260 to control the coal drying process. The mode library 276 will be described in greater detail below.

As mentioned with reference to FIG. 2, the data channel 216 receives process data from the controlling unit 208 and supplies training data to the learning unit 212. More precisely, a data filter 276 in the data channel 216 receives process related data from the data acquisition module 274 and prepares the data for the learning unit 212. In particular, the data filter 276 prunes and reorganizes the copious volume of data captured by the data acquisition module 274 such that training sets, consisting of only the process data on which the learning unit 212 is to be trained, are output. Moreover, since many machine learning techniques perform best when their training data is scaled to an interval such as [0,1], the data filter 276 also scales the data appropriately prior to output.

The learning unit 212 to which the data filter 276 supplies training data includes a neural net module 278, having a neural net development system. Neural nets are well known in the art for learning the associations between process control settings and resulting process response data. In addition, the learning unit 212 also includes a training data base 282 for storing the data input by the data filter 276 for use in training the neural net module 278. Briefly, the training of the neural net module 278 involves performing the following two procedures (a) and (b) iteratively: (a) supplying the neural net of the neural net module 278 with a representative training data collection from the processing of previous coal drying runs, such a data collection includes (scaled versions of): the substantially uncontrollable environmental sensor data (e.g., ambient air temperature, windspeed, etc.), related process control data (e.g., attribute controller setpoints and related process sensor readings), and the resulting product characteristic data; and (b) subsequently having the neural net adjust its neural weights to reflect the relationships within the data collection between the substantially uncontrollable environmental sensor data, the process control data, and the resulting characteristics of the dried coal. Further, note that in some cases, it is also advantageous to include data related to substantially controllable process influencing factors in the training data collections, for example, internal coal drying facility 10 sensor data from (critical) substantially controllable factors such as the above deck temperature from sensors 62 or the free oxygen content in the heat transport gas from sensors 32. Thus, using this additional process influencing sensor data, any process control settings output by the neural net are related to a predetermined collection of (critical) internal sensor values. In any case, once the neural net is sufficiently trained, it is supplied with a predetermined input including at least the substantially uncontrollable environmental sensor data and the output product characteristic data which is desired. Using these inputs, the neural net is able to determine a related collection of process control settings (e.g., setpoints) whereby the coal drying facility 10 can be expected to produce dried coal having the desired product characteristics when the facility environment 250 sensor data are substantially similar to the environmental sensor data supplied to the neural net. In the current embodiment, this training process is substantially automatic. However, the training process can be partially directed by a human training operator (typically different from the process operator). That is, the training operator can determine which collections of training data are to be used in training the neural net module 278 and, optionally, the training operator can direct the neural net module 278 to be more or less sensitive to perceived relationships within the training data.

When a combination of sensor data, desired product characteristic data and the related process control settings is established by the trained neural net, the combination becomes a candidate to be used by the controlling unit 208, in particular, the supervisor 262 and the PLC 260. To supply the combination to the controlling unit 208, the data conduit 220 includes a submode generator/filter 290. The submode generator/filter 290 uses each such combination output by the neural net module 278 for generating a submode. In addition, the submode generator/filter 290 evaluates the "reasonableness" of the generated submodes, as will be discussed below, by determining the value of a "confidence prediction factor" for each generated submode whereby the value of the confidence prediction factor is an indication of the expected performance of the submode when used by the supervisor 262.

Each submode (and mode) is a table-like data structure containing, in the present embodiment, coal drying process related values of each process "data device," i.e., a sensor or attribute controller, used by the controlling unit 208 in controlling the coal drying process. For example, each (sub)mode includes a collection of data fields per data device, the data fields specifying values for the following properties. With regard to processing configuration information of (4.1):

(7.1) a data acquisition switch: an on/off switch specifying whether the values for the data device should be recorded by the data acquisition module 274 when the coal drying facility 10 is not drying coal. Note, for safety reasons some sensors, particularly temperature sensors, are always monitored;

(7.2) an in-service flag: an indicator as to whether the data device must be in service for the (sub)mode to function properly. Out of service data devices are flagged as such, forcing any control logic which utilizes the data device to invoke a backup data device or activate an alarm;

With regard to the performance target values of (4.2):

(7.3) dried coal characteristics: including a target moisture content;

(7.4) the target tonnage rate of the output dried coal (tons per hour).

(7.5) target values for the percentage of free oxygen in the heat transport gas, the under deck temperature (output via sensor 58) and the exhaust fan temperature (output via sensor 78).

With regard to the process control data of (4.3):

(7.6) a device lag time: the length of time required for the data device to sense a change in coal drying facility 10 operation;

(7.7) device delay time: the time lapse between responses from the data device;

(7.8) tuning control data: that is, at least setpoint, deadband, and execution frequency data;

(7.9) alarm range data: that is, at least high, high-high, low and low-low alarm range values;

(7.10) trending time attributes: time lag values for sensor data devices indicating when output from the sensor should be sampled for detecting both fast and slow drifts in sensor readings from historical ranges;

(7.11) use delay time attributes: sensor data device timing values indicating the time intervals between invocations of control processing computations using the output of the data device.

In addition, there are further (sub)mode data fields providing context information, i.e., applicability data (4.4), relating a (sub)mode to a specific coal drying context(s). This context information includes at least data related to the desired product characteristics, the substantially uncontrollable process influencing factors. More precisely, the substantially uncontrollable process influencing factors include:

(7.12) environmental factors: including ambient temperature, windspeed, wind direction, humidity and barometric pressure;

(7.13) input coal characteristics: including an index relating to the input coal particle size distribution, moisture content and temperature.

Further, each (sub)mode includes the confidence prediction factor discussed above and at least one demonstrated performance (or error) measurement, whose value is derived from the use of the (sub)mode by the supervisor 262, indicating the demonstrated performance of the (sub)mode.

Referring still to FIG. 3B, the mode library 276 is connected to the submode generator/filter 290 for automatically receiving the submodes deemed worthwhile. The mode library 276 provides both storage and access to the modes and submodes. The modes and submodes are categorized within the mode library 276. The modes are categorized by their related coal drying facility 10 "states." That is, a state specifies the coal drying facility 10 configuration of the equipment that has been activated and/or inactivated, the extent and type of control the process manager 258 assumes, and the operating procedures and expectations of drying facility 10 personnel. For each state there can be modes specific to the state. Each such mode specifies the initial process control data to be used in monitoring and controlling the coal drying facility 10 for a given set of state allowable target values as in (7.3) through (7.5). The submodes are categorized within the mode library 276 by the unique mode to which each is related. That is, each submode specifies the process control data for achieving the same target values as for the related mode. However, the submode's process control data is tailored to achieve the target values for a narrower range on the substantially uncontrollable process influencing factors as in (7.12) and (7.13). Thus, whenever a new process state is entered, the mode library 276 provides the process manager 258 with a mode (i.e., the active mode) providing the initial configuration of process control settings to be used in controlling and monitoring the coal drying facility 10. Subsequently, for example, as the substantially uncontrollable process influencing factors change, a submode, related to the active mode, can be invoked to better achieve the desired product characteristics.

To provide the mode library 276 functionality, the library includes two modules: the mode repository 294 and the mode access module 298. The mode repository 294 provides the storage for both the modes and submodes. Thus, whenever a new submode is output by the submode generator/filter 290, the submode is automatically deposited in the mode repository 294 and associated with a predetermined mode. Similarly, whenever a new mode is manually entered by a human mode developer, the mode is also deposited in the mode repository 294. The mode access module 298, on the other hand, provides the functionality both for accessing the various modes and for determining whether there is an alternative submode, related to the active mode, which can yield a more cost effective and/or safer performance from the coal drying facility 10 than the mode or submode currently being used by the process manager 258. Thus, periodically, the process manager 258 receives a new submode from the mode library 276 via the mode access module 298.

To describe the supervisor 262 in more detail reference is made to FIGS. 5A–5E, 6A–6B, 7A–7B and 8A–8B. The supervisor 262 was developed using the expert system shell, G2 by Gensym Corporation 125 Cambridge Park Dr., Cambridge, Mass. 02140. The G2 Reference Manual is hereby included by reference. In FIG. 7 a high level block diagram is presented of the modules within the supervisor 262 together with arrows indicating the primary data flow paths. The real time data interface (or simply, data interface) 700 provides all communication between the supervisor 262 and the actuator control unit or PLC 260. Thus, the real time data interface 700 provides both real time input and output data buffering for the supervisor 262. The data interface 700 receives, at fixed intervals, a series of fixed length data packets from the PLC 260 providing sensor data and alarm data. The data interface 700 transfers substantially all data within the data packets to a knowledge base/data server 708. This module provides a data repository of substantially all fast access data residing in the primary memory of the supervisor 262. Data is stored in the knowledge base/data server 708 either (a) in data buffers, denoted "data servers," with each such buffer capable of storing the value of a predetermined control processing variable value, or (b) in a knowledge base of data records, more precisely "objects," whose data structure definitions are defined within a hierarchy of object oriented data structure definitions, conventionally known as "classes." The knowledge base/data server 708 exchanges data with the real time inference engine (or simply, inference engine) 712. The inference engine 712 schedules and executes expert system rules (i.e., if-then rules) residing in a plurality of rules bases (alternatively partitions of a single rule base). In the process of scheduling and executing a rule, the inference engine 712 accesses objects from the knowledge base portion of the knowledge base/data server 708 to supply values to various predetermined parameters within the rule. Furthermore, the inference engine 712 automatically retrieves data values from the data servers within the knowledge base/data server 708 to assign values to fields of objects within the knowledge base/data server 708. The assignment of values to objects automatically triggers the scheduling for execution of rules by the inference engine 712. The inference engine 712 receives rules to be executed from a plurality of predetermined rule bases (or partitions of a single rule base), in particular, a process tuning rule base 716, a communication monitoring rule base 720, a process operator display rule base 724, an alarm handling rule base 728 and an internal alarm activator rule base 728. Moreover, for each rule base there is a related module of procedures such that for a rule whose "if" portion is determined to be true or satisfied, the "then" portion executes a related procedure.

With regard to the process tuning rule base 716, this rule base contains rules for tuning the process being controlled. The rules in this rule base are parameterized such that they are substantially independent of the process being controlled. For example, there are tuning rules for determining when to evaluate the performance or acceptability of the process and when to determine an attribute controller to be tuned. Further, there are low level rules for automatically decrementing certain process control timers. For example, there are lag timers used in measuring time intervals where process tuning is suspended such that the effects of a previous tuning action can be determined before further actions are taken.

With regard to the communication monitoring rule base 720, this rule base contains rules for determining whether the communication channels are sufficiently reliable between the PLC 260 and the supervisor 262, and between process operator display 268 and the supervisor 262. If communications are determined to be insufficiently reliable, then alarm objects in the knowledge base/data server 708 are activated and/or the process being controlled is shutdown.

With regard to the operator display rule base 724, this rule base provides the rules for updating the process operator display 268.

With regard to the alarm handling rule base 728, this rule base contains a collection of substantially application independent rules for handling alarms activated either externally to the supervisor 262 by the PLC 260, or alternatively, activated internally within the supervisor 262.

With regard to the internal alarm activation rule base 732, this rule base contains a collection of substantially application dependent rules (e.g., coal drying rules) for analyzing the data provided by the PLC 260 for abnormal or unsafe process trends. If such trends are discovered, then an "internal" alarm object is activated in the knowledge base/data server 708.

It should be noted with regard to processing of alarm objects, as with other objects in the knowledge base/data server 708, any change to such an object can automatically trigger the scheduling of a rule(s) with predetermined references to the object in the "if" portion of the rule. Thus, each rule base 716–732 cooperates with the inference engine 712 to supply the inference engine 712 with the rules to be scheduled for execution according to, among other conditions (such as rule priorities), changes to objects in the knowledge base/data server 708. Furthermore, when the "if" portion of a rule is determined to be satisfied or true, then a predetermined procedure is invoked specifying an action to be accomplished. For the tuning rules in the process tuning rule base 716, the process tuning procedures are invoked. The procedures here (a) shift the operating window of a tuning rule specified attribute controller, (b) modify the execution frequency of a tuning rule specified attribute controller, and (c) access alternative submodes from the mode library 276 via the mode access module 298.

With regard to the communication monitoring rule base 720, there are communication monitoring procedures 740. These procedures both activate alarms and, in severe or extended communication difficulties automatically shut down the process being controlled without assistance from the process operator. Thus, these procedures can activate alarm objects within the knowledge base/data server 708 which, in turn, initiate alarm messages to the process operator via the process operator display rule base 724 and the procedures invoked by these rules, i.e., the procedures residing in the process operator display driver 742. However, regardless of any process operator response, if a communication difficulty is severe or prolonged enough, then the communication monitoring procedures 740 can shut down the process being controlled.

With regard to the alarm rule bases 728 and 732, there are alarm handling procedures 744. These procedures monitor whether a process operator has responded to an alarm within a predetermined required time, clear alarms to which a successful response to the alarm condition has occurred and write alarm data to the data acquisition module 274 in order that the alarm event can be logged.

Figure 4:
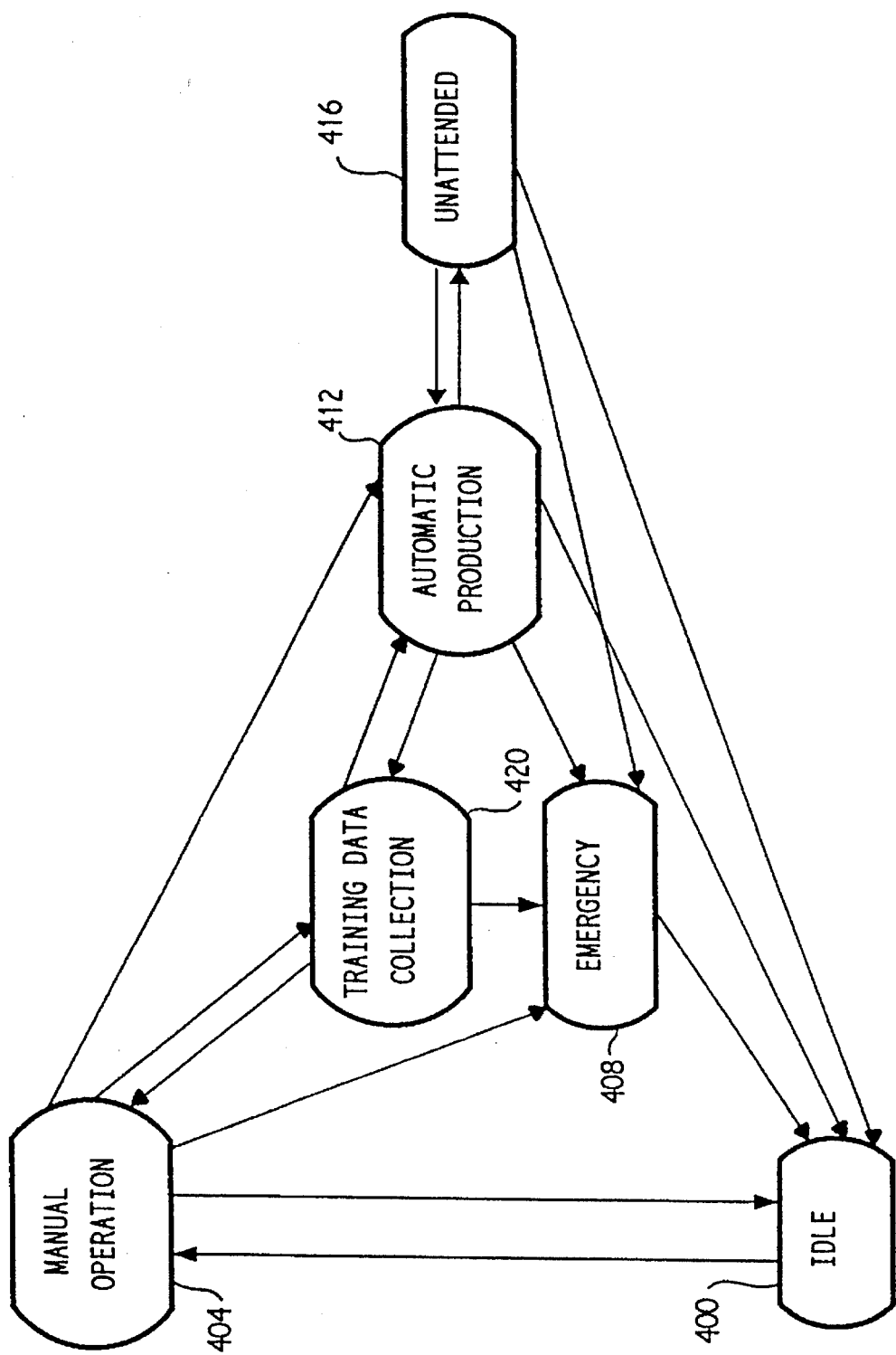
FIG. 4 is a state transition diagram illustrating the high level states in which the process controller of the present invention can enter.
Figure 5A:
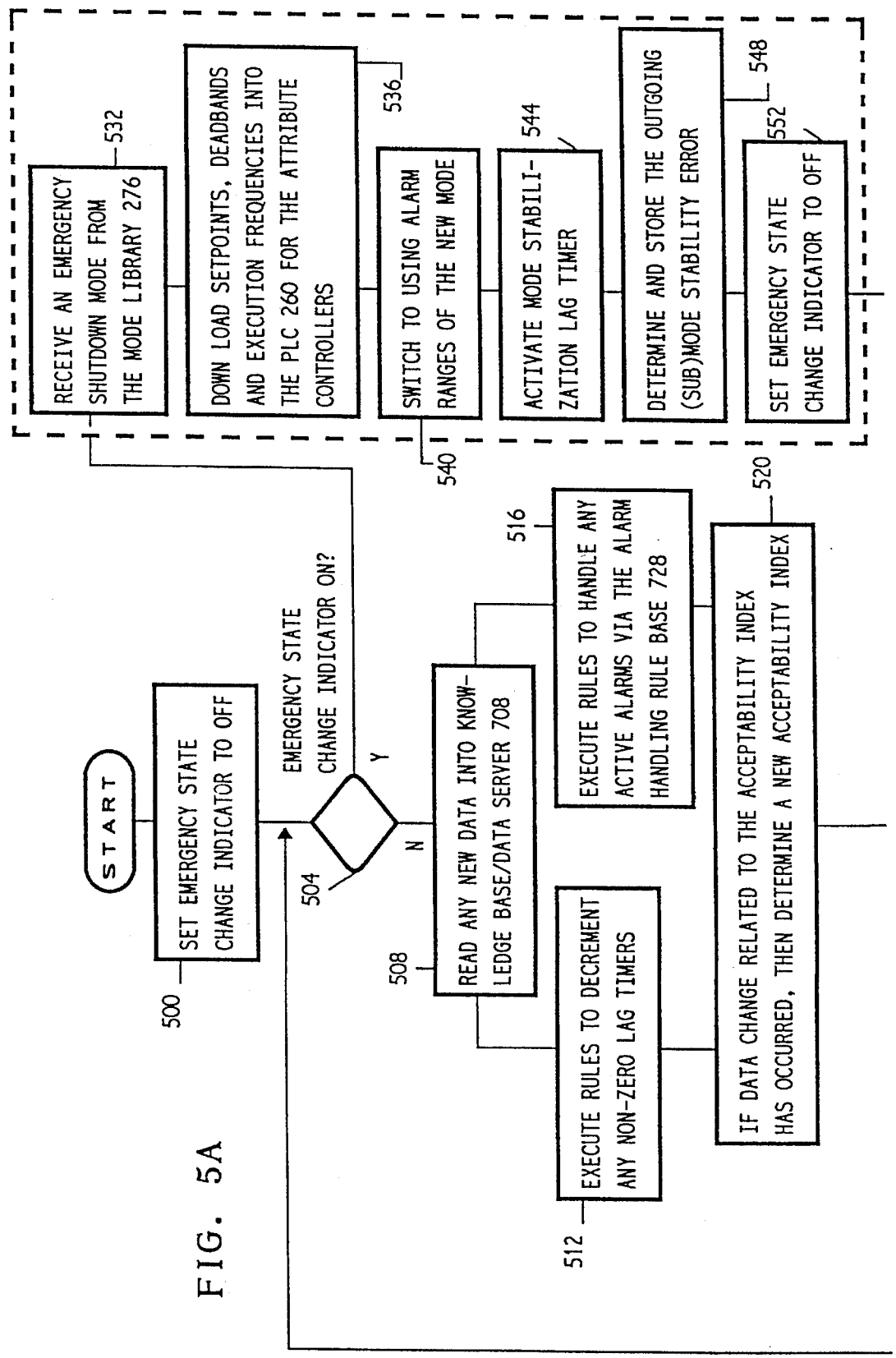
Figure 5B:
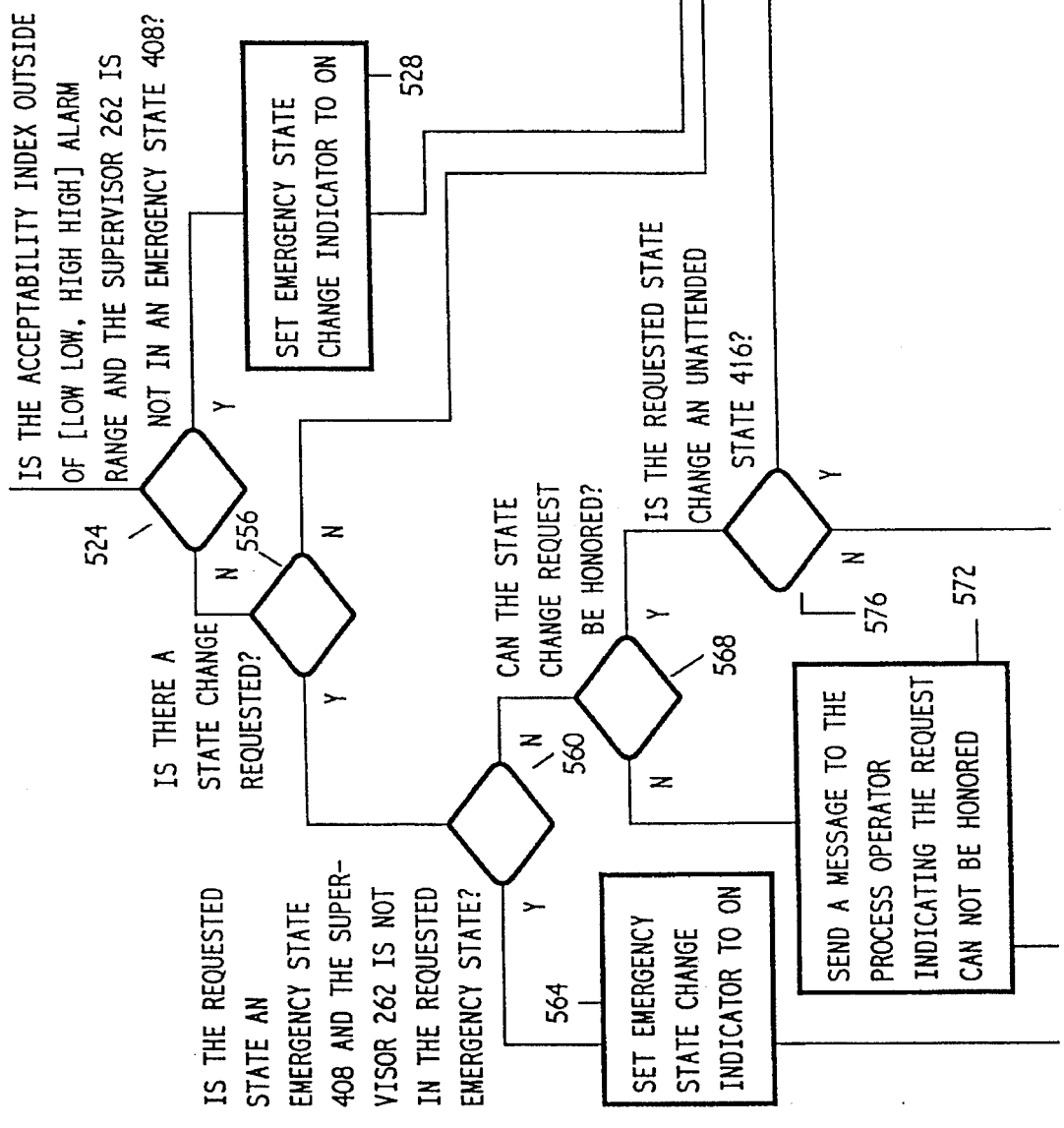
Figure 5C:
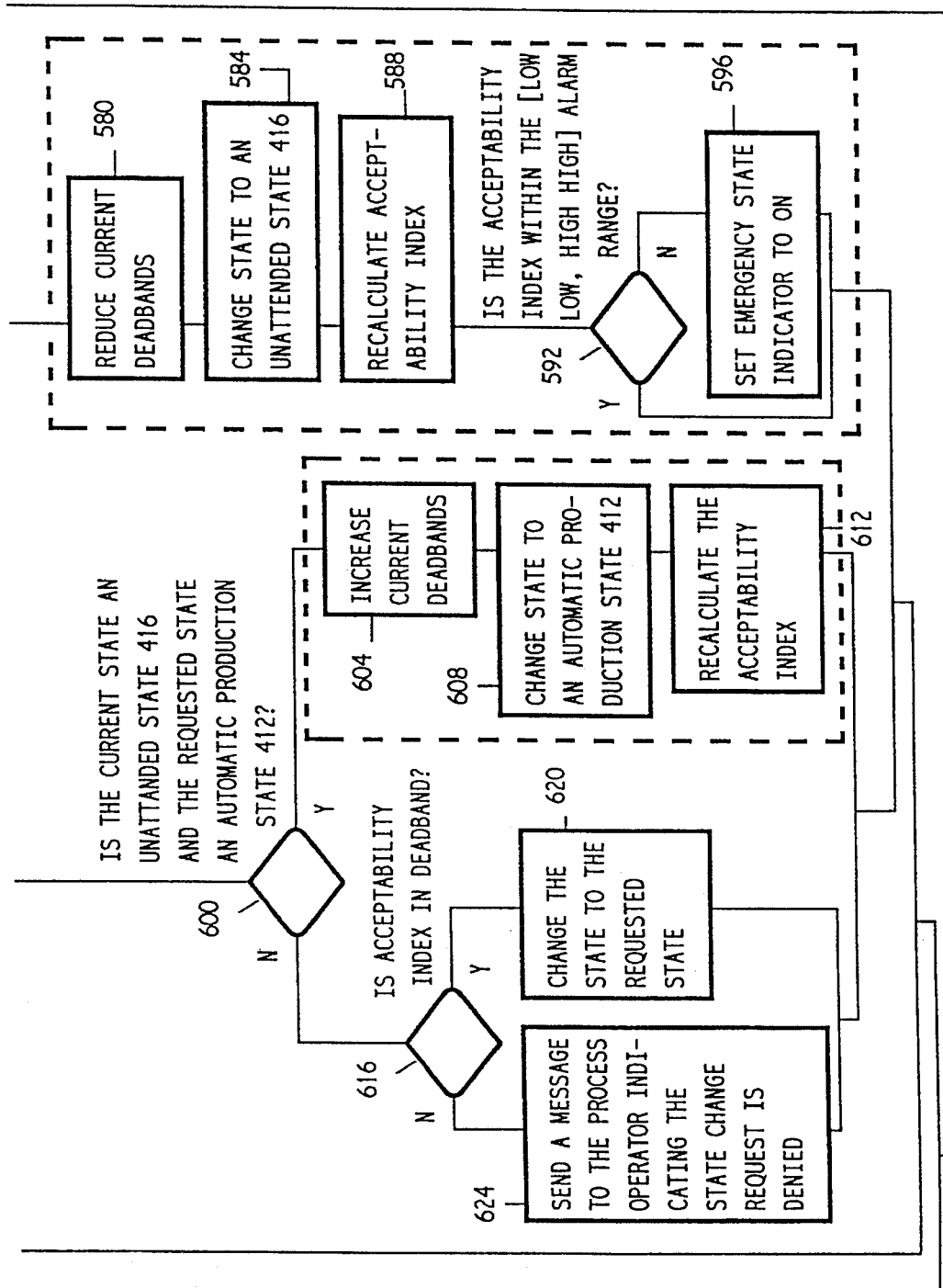
Figure 5D:
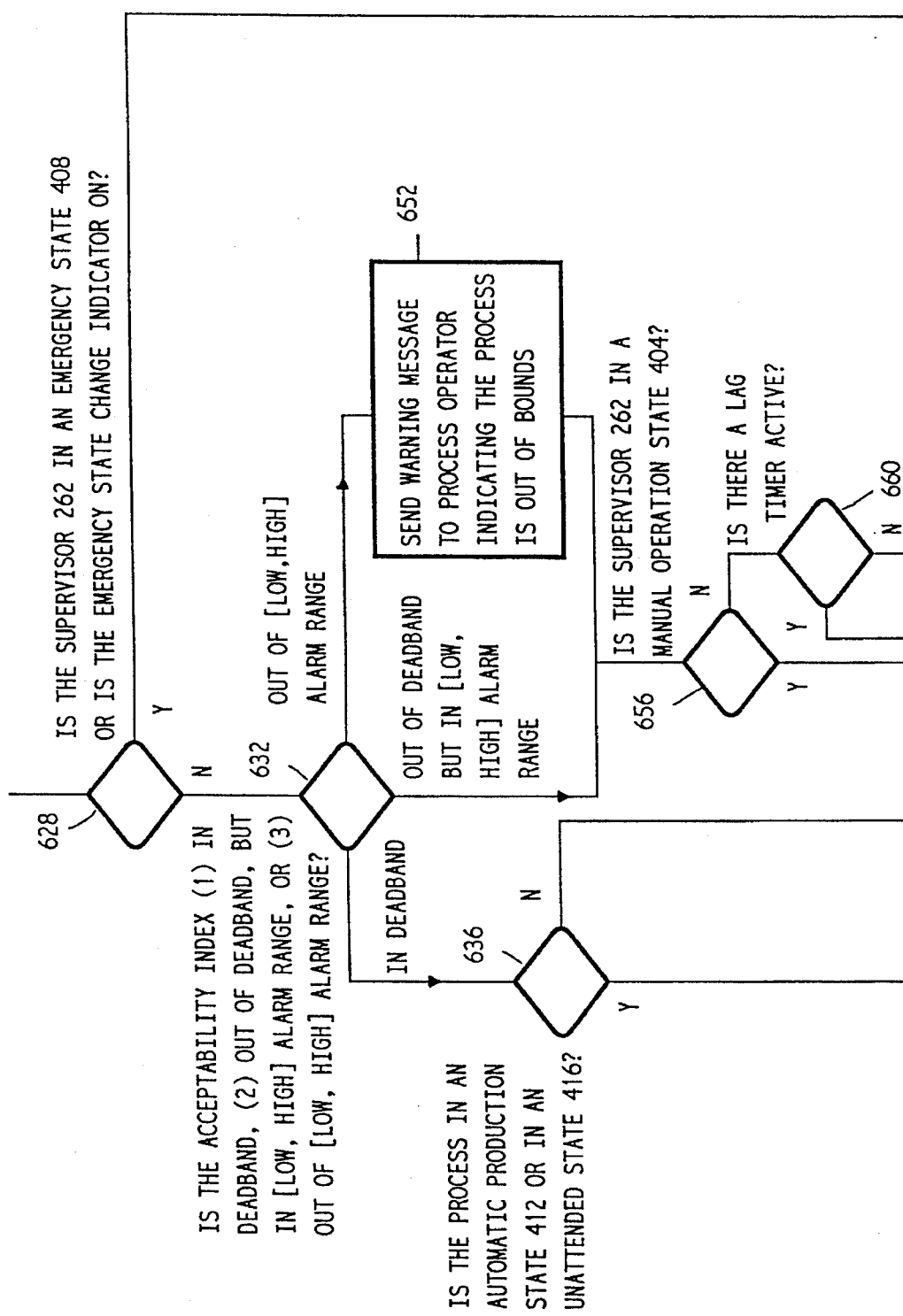

To describe the real time operation of the coal drying process controller 200, reference is made to FIG. 4 which represents a high level state transition diagram relating to the controlling unit 208 and in particular to the supervisor 262. Each oval in this diagram represents a high level state or, equivalently, a collection of one or more related states of the controlling unit 208. The arrows indicate legal transitions between the high level states. In preparation for drying coal, the controlling unit 208 is typically in an idle state 400. In such a state, the controlling unit 208 monitors fire detection sensor data from, for example, heat and smoke detectors. Alarms and abnormal fire sensor data are recorded by the data acquisition module 274. In addition, if the coal drying facility 10 is not being manually monitored, then critical alarms will trigger an automated telephone call, via voice simulator and telephone dialer 272, with a voice synthesized message to at least one predetermined person.

In a manual operation state 404, the process operator manually directs the controlling unit 208 and thus manually controls the coal drying facility 10. In addition, substantially all controlling unit 208 input and output is recorded by the data acquisition module 274. In an emergency state 408, the coal drying process is shut down in 10 seconds to 90 seconds, depending on the urgency of the emergency state. Moreover, if the emergency is severe enough, portions of, or the entire coal drying facility 10 can be deluged with water stored in water tanks 176 surrounding the coal drying facility 10.

In an automatic production state 412, the operator substantially relinquishes the coal drying process to the controlling unit 208. In fact, substantially the only tasks remaining to the operator are:

(8.1) changing a production mode. Preferably, this entails the process operator only inputting a new desired moisture content for the dried coal output. However, new production rates may also be input;

(8.2) ordering a fast shut-down in response to an abnormal condition(s);

(8.3) ordering an immediate deluge of the coal drying facility 10 with water stored in water tanks 176 about the coal drying facility 10;

(8.4) interpreting alarms and messages, and directing any repair and/or bypass operations; and (8.5) accessing the data acquisition module 274 to analyze coal drying process data and print reports.

Thus, in an automatic production state 412, the controlling unit 208 starts and controls at least the following process functions:

(9.1) reads and records substantially all controlling unit 208 input and output;

(9.2) updates the process operator display 268 as to the coal drying process status;

(9.3) records substantially all control actions taken by the supervisor 262;

(9.4) monitors and records all alarms, reporting them to the process operator;

(9.5) manages all critical alarms such that serious alarms are automatically responded to whereas less serious alarms are reported to the process operator to evaluate and, if possible, correct;

(9.6) continually examines data from the coal drying process for trends. If the process varies significantly from trend data of a previous coal drying run with similar control process settings and external conditions, then an internal alarm will be activated;

(9.7) evaluates PLC 260 attribute controller errors, that is, process deviations relating to setpoints and deadbands, to determine if either (a) one or more setpoints and deadbands should automatically be shifted to stabilize the coal drying process, or (b) the execution frequency of one or more attribute controllers should be modified; and (9.8) periodically samples the external facility environmental sensors and uses this data in any request for a new submode from the mode library 294.

In an unattended state 416, the controlling unit 208 is assumed to be unmonitored by a process operator since pending alarms and output messages have not been promptly responded to by the process operator. In such a state, the controlling unit 208 attempts to maintain the same production target goal(s) as the currently active (sub)mode. However, the process control alarm ranges are narrowed, preferably by 10% to 20% for safety reasons.

In a training data collection state 420, the current process setpoints and product target values are retained. However, the deadbands are shrunk to exactly the setpoints. This causes the process attribute controllers of the PLC 260 to substantially continually control the process in order to maintain each process control attribute exactly at its setpoint. Thus, extreme or atypical process data patterns are generated that can be used in training the neural net 278.

In a typical operating sequence, the controlling unit 208 is initially in an idle state 400 such that, for example, maintenance can be done. Upon entering this state, the controlling unit 208 requests an appropriate "idle" mode from the mode library 276 for setting at least the alarm ranges for the fire detection sensors. Subsequently, a process operator instructs the controlling unit 208 to transition to a manual operation state 404. A manual operation state 404 is primarily intended as a process start-up state such that once the coal drying process has been activated and stabilized within the appropriate deadbands, the process operator can request the controlling unit 208 to transition to an automatic production state 412 and thus relinquish substantially all real time process control. As part of the transition from an idle state 400 to a manual state 404, the process manager 258 requests an appropriate "start-up" mode from the mode library 276. Such a start-up mode preferably will establish relatively wide deadbands for the attribute controllers, thus allowing the process operator flexibility in attempting to stabilize the coal drying process on start-up. In addition, to complete the transition, the process operator must also input the production target values such as the desired moisture content of the output dried coal. Since the intention is that the process will be in a manual operation state 404 a relatively short time and subsequently transition to an automatic production state 412, the process manager 258 automatically uses the input product target values plus at least the environmental sensor readings to request an appropriate "automatic production" mode from the mode library 276. However, the controlling unit 208 will only transition to an automatic production state 412, upon the process operator's request, when all of the received sensor readings are at least within the deadband ranges of this automatic production mode or, more precisely, when a global process evaluation measurement known as the "acceptability index" is within a predetermined range as will be discussed with reference to FIG. 5 below.

To honor a request from the process operator to enter an automatic production state 412, the controlling unit 208, in preparation, downloads the automatic production mode data into the supervisor 262 and the PLC 260 as the current working process control settings. Subsequently, after a predetermined time (e.g., 5 minutes), if the coal drying process has stabilized within the predetermined range for the acceptability index, the control unit 208 then assumes control of the coal drying process and informs the process operator that the automatic production state 412 has been entered.

In an automatic production state 412, the controlling unit 208 can automatically transition to an idle state 400, an emergency state 408, or an unattended state 416. An idle state 400 and an emergency state 408 will be automatically entered if an alarm activates which is either too serious or too long lasting to wait for the process operator to take corrective actions. An unattended state 416 is automatically entered when the controlling unit 208 determines that the process operator is not adequately responding to displayed messages and alarms.

In addition to these automatic state transitions, the process operator can direct the controlling unit 208 to transition to either an idle state 400 or an emergency state 408. Further, a process operator with sufficient controlling unit 208 access privileges can force the controlling unit 208 into a training data collection state 420 to gain substantially different training data for the learning unit 212.

Referring now to FIGS. 5A–5E, flow charts are presented of the high level steps performed by the supervisor 262 when automatically controlling the coal drying process. Since the supervisor 262 executes both expert system rules, via the real time inference engine 712, and more conventional procedural programs, the flowchart of FIGS. 5A–5E include steps that are (portions of) rules as well as steps that are (portions of) procedures. In particular, FIGS. 5A–5E illustrate the high level steps performed during both the state transitions of FIG. 4 and the tuning of the coal drying process using the rules of the process tuning rule base 716 and the procedures in the process tuning procedures 736.

As an overview, note that FIGS. 5A–5E are fundamentally a single continuous loop including all steps beyond step 500. The loop steps describe the actions performed by the supervisor 262 as relating to the state transitions of FIG. 4 and process tuning during each real time clock cycle. That is, it is intended that all the steps on some control path through the loop will be performed in each real time clock cycle where, in the current embodiment, such clock cycles are approximately 1 second in duration. However, it should be noted that since the responsibility for timing control resides with the real time inference engine 712, this module also has the capability to truncate any FIGS. 5A–5E loop iteration if a clock cycle is exhausted before the loop iteration completes. Thus, the steps within the loop are prioritized such that those which must be performed on substantially every loop iteration are performed first while those of lesser criticality are performed later in the clock cycle. This prioritization is also reflected in FIGS. 5A–5E in that each step closer to the beginning of the loop (i.e., closer to step 504) is deemed more important to perform regularly than any subsequent step. Also, on occasion, certain sequences of steps must be performed without preemptive intervention. These steps are blocked in dotted lines indicating that all such steps within the dotted lines must be performed if any one of the steps is performed.

FIGS. 5A–5E will now be described in detail. Step 500 is an initialization step wherein the variable or flag, "emergency state change indicator" used to specify that the process should enter an emergency state 408 is set to off, thereby indicating that the process should not enter an emergency state. Subsequently, in step 504 a determination is made as to whether the process is to enter an emergency state 408. In this first iteration of the loop beginning at 504, the negative branch is taken thereby encountering step 508. In this step, new data is input from the real time data interface 700 to the knowledge base/data server 708. This data typically includes newly obtained process sensor values (e.g., values from temperature sensor 62), PLC 260 alarm data and measurements of substantially uncontrollable process influencing factors. Note that also included within the new data for each loop iteration is a new value for a variable, "secs," which is used to store the elapsed time in seconds the process has been operating. Further, note that all such input data is also written to the data acquisition module 274. Subsequently, once the new data has been read, the inference engine 712 schedules for execution the highest priority rules (from the rule bases 716 through 732) that have been identified for possible execution. In general, such a rule is identified by having a reference to a changed value or object within the rule's "if" portion. In particular, in steps 512 and 516, which are performed substantially concurrently, two types of rules are scheduled. That is, in step 512, rules are scheduled for decrementing any active wait or lag timers used for delaying the initiation of certain supervisory control operations until the effects of previous such operations have been given time to become evident (two such lag timers are discussed below). Further, in step 516, rules are scheduled to handle process alarms that are active.

Subsequently, in step 520, a process "acceptability index" is (re)calculated if any of the new data from step 508, used in the calculation of the acceptability index, has changed. The process acceptability index is a numerical value used to measure the stability of the process. There are, no doubt, numerous metrics according to which an acceptability index can be computed. In general, such an index is a function of at least the measured process attribute values or sensor readings such that a determination can be made indicating when any process attribute is outside of its deadband range. Further, it is possible to construct such an index whereby measured product characteristic values, relating to a product output from the process, are incorporated into the index, thereby indicating an acceptable quantity and/or quality of the product. In the current embodiment of the present coal drying process, the acceptability index is:

$$(\sqrt{M * E^P}) * P$$

where

M = the weight of the input coal being processed;
E = the waste energy measured as the temperature of the exhaust fan temperature sensor 78; and
P = a weighted average of the total process error.
That is, $$P = \sum_{j=1}^{N} (|SP_j - A_j| * W_j/(0.5 * DB_j))/N$$

where

N = the number of active attribute controllers;
$SP_j$ = the setpoint for the $j^{th}$ active attribute controller;
$A_j$ = the actual process value for the $j^{th}$ active attribute controller;
$W_j$ = a positive weighting value which allows the term $|SP_j - A_j|$ to be of greater significance as the weight is increased; and
$DB_j$ = the deadband for the $j^{th}$ active attribute controller.

Thus, the present acceptability index modifies the total process error P by the term:

$$\sqrt{M * E^P}$$

as a way to amplify the index value when a large amount of coal is being processed and/or when there is excessive waste energy in the process.

Following any computation, in step 520, of the acceptability index, in step 524, a determination is made as to whether the acceptability index is within an appropriate outermost range. In general, such an acceptability index is provided with predetermined bounds in a manner similar to setpoints. That is, there are alarm values: low-low ≤ low ≤ high ≤ high-high for the acceptability index. Thus, the acceptability index values are related to their alarm values in the following ways: (a) acceptability index values outside the [low-low, high-high] alarm range results in both generating alarms and causing the supervisor 262 to enter an emergency state 408; (b) acceptability index values inside the [low-low, high-high] range but outside the [low, high] range results in generating warning alarms. Further, the acceptability index also has a deadband range contained within the [low, high] range whereby the deadband indicates the range of acceptability index values the process must be within in order for the supervisor 262 to undertake certain predetermined actions as will be discussed below.

It is also important to note in the present case, since the current acceptability index remains positive and values as close to zero as possible are preferred, the low-low and low alarm limits as well as the low deadband limit are unnecessary and therefore not used, or, equivalently, these limits can be given negative values. Nevertheless, for generality, the steps of FIGS. 5A–5E are described in a context where the acceptability index is tested against these three lower limits as well as the corresponding upper limits of the alarms and deadband.

Continuing with step 524, if the acceptability index is not within the [low-low, high-high] range and the supervisor 262 is not in an emergency state 408, then step 528 is next encountered where the emergency state change indicator is set to "on" and subsequently step 504 is again encountered causing the positive control branch for this step to be performed whereby steps 532 through 552 cause the supervisor 262 to enter an emergency state 408.

Referring now to steps 532 through 552, in step 532 an emergency shut-down mode is received from the mode library 276. In the current embodiment, this is accomplished in the same manner as is used when the supervisor 262 receives any (sub)mode from the mode library 276. That is, a mode library processor (not shown), separate from the computer processor (also not shown) upon which the supervisor 262 executes, is used to maintain and access the mode library 276. The mode library processor monitors the flow of information between the process manager 258 and the data acquisition module 274. Thus, since substantially all process related data is transferred to the data acquisition module 274, the mode library processor reads this data transfer to determine when to present a new (sub)mode to the supervisor 262. In the present case, where an emergency state 408 is entered, alarm data relating to the emergency state is transferred to the data acquisition module 274 and this data is read by the mode library processor. Subsequently, the mode access module 298 retrieves an appropriate emergency shut-down mode from the mode repository 294, copies this new mode to a mode buffer (not shown) within the process manager 258 and sets a flag alerting the supervisor 262 of the availability of new (sub)mode data.

Following this, in step 536, the supervisor 262 downloads into the PLC 260 the new setpoints, deadbands and attribute controller frequencies of the new emergency mode residing in the flagged mode buffer. Upon sensing the flag, the supervisor 262 downloads the data within the buffer and commences to use this data to shut down the process. In particular, in step 540, the supervisor 262 switches to using alarm ranges that are appropriate for a shut-down of the process. Next, in step 544, the supervisor 262 activates a mode stabilization lag timer such that further process control changes are delayed for a predetermined lag timer interval.

Subsequently, in step 548, the outgoing (sub)mode previously accessed by the supervisor 262 has a "stability error" determined and associated with the copy of this (sub)mode in the mode repository 294. Such a stability error is associated with each (sub)mode accessed by the supervisor 262. The stability error is used to determine which (sub)modes are to be replaced or deleted from the mode repository 294 due to insufficient performance when accessed by the supervisor 262. In particular, for submodes there is a stability error filter such that whenever the stability error of a submode is above (below) a predetermined error stability threshold, then the submode is flagged for deletion (retention).

The stability error is preferably a function of the deviation of each process attribute from its preassigned setpoint. That is, the stability error is preferably a function of: (a) the number of deviations of each process attribute within a predetermined time period, and (b) the relative size of the deviations (e.g., in comparison to the related deadband width). More precisely, the currently preferred formula for computing a (sub)mode's stability error is:

$$\frac{\left(\sum_{K=1}^{NS} P_k\right)}{NS}$$

where $P_k$ = the $k^{th}$ evaluation of P, as defined with respect to the acceptability index, while the (sub)mode is continuously being accessed by the supervisor 262;

NS = the number of seconds the (sub)mode was continuously accessed by the supervisor 262.

Further, note that for most process control applications, the stability error threshold is anticipated to be in the range: 0.1 to 0.3. Moreover, note that this threshold can be modified. In particular, decreasing this threshold provides a mechanism for retaining in the mode repository 294 progressively more optimal submodes.

Once the stability error for the outgoing (sub)mode is stored, in step 552, the emergency state change indicator is set to "off" since the state change is now complete. Following this, the control flow returns to step 504 whereby the steps 504 through 524 are again performed. However, at step 524 the negative control branch is now taken.

Regardless of whether the first encounter of step 524 resulted in an emergency state being entered via step 528, upon some iteration of the loop in FIGS. 5A–5E, step 556 is eventually encountered. In this step, a determination is made as to whether a state change is being requested, either automatically by the supervisor 262 due to activated alarms or as a request from the process operator. The following examples are of such requested state changes:

(10.1) an automatic request to transition from an automatic production state 412 to an unattended state 416 whenever the process operator is not responding to messages being displayed on the display 268;

(10.2) an automatic request to transition to an emergency state 408 whenever a data communication link between substantially any real time activated components of the process control system 200 is interrupted for a predetermined time interval;

(10.3) a state transition request from the process operator.

If a state change request is detected in step 556, then any resulting state change actions occur in the steps up to step 628, this latter step being a test to determine whether process tuning is to be considered. Assuming for the moment that a state change request is discovered at step 556, then in step 560 a determination is made as to whether the new state requested is an emergency state 408 that is not any emergency state that the supervisor 262 is currently in. For example, the supervisor 262 may automatically enter an emergency state due to (10.2) above. However, during the shut-down process the process operator can request a faster shut-down that includes a deluge of the coal drying facility 10 with water if circumstances necessitate such extreme actions. If the determination in step 560 is positive, then step 564 is encountered and the emergency state indicator is set to "on." Subsequently, in step 628 a determination is made as to whether the supervisor 262 is in an emergency state 408 or the emergency state change indicator is "on." If either of these two conditions hold, as is the case presently, then process tuning is inappropriate and therefore the tuning steps 632 through 680 are circumvented and step 504 is again encountered. Alternatively, if step 560 results in a negative outcome, then step 568 is encountered where a determination is made as to whether the state change request can be honored. That is, for example, if the current state change request is from one of the high level states of FIG. 4 to another such high level state, then the change must be represented by a state transition arrow in FIG. 4. Moreover, the proper conditions must hold in order for some state transitions to be legal (e.g., see the above discussion regarding a transition between a manual operation state 404 and an automatic production state 412). Further note as an aside, all such state transitions to an emergency state 408 are legal. Thus, it is not inappropriate to handle emergency state change requests separately in step 556 (and thus at a higher priority also).

If the state change request cannot be honored in step 568, then presumably the state change was requested by the process operator. Thus, in step 572 a message is transmitted to the process operator, via the display 268, indicating that the state change request cannot be honored and subsequently step 628 is encountered. Alternatively, if the requested state change can be honored, then step 576 is performed whereby a determination is made as to whether the request is for a change to an unattended state 416. If the determination is affirmative, then in step 580 the current process attribute controller deadbands are narrowed by 10–20%. In addition, the acceptability index deadband is also narrowed by 10–20% (note, however, for the present acceptability index, only the high deadband limit is modified, e.g., moved closer to zero). Subsequently, in step 584, the state is changed to an unattended state 416. Then, in step 588, the acceptability index is recalculated to reflect the narrowed deadbands. Following this, in step 592, a determination is made as to whether the acceptability index is still within the [low-low, high-high] alarm range. If not, then in step 596 the emergency state change indicator is set to "on." Finally, regardless of the outcome from step 592, step 526 is encountered to determine whether process tuning is to be considered.

Returning again to step 576, if an unattended state 416 is not requested, then step 600 is performed whereby a determination is made as to whether the current state is an unattended state 416 and the requested state is an automatic production state 412. If the determination is affirmative, then in step 604 the deadbands, that were narrowed in step 580 of a previous iteration of the loop of this program, are expanded to their original values. In step 608, the state is changed to an automatic production state 412. In step 612, the acceptability index is recalculated to reflect the expanded deadbands and, subsequently, step 628 is again encountered. As an aside, note that no step such as 592 is necessary after step 612 since for the present acceptability index any decrease in its value is beneficial and by expanding process attribute controller deadbands, the acceptability index can only decrease.

Referring again to step 600, if the negative branch is taken from this step, then in step 616 a determination is made as to whether the acceptability index is within its deadband. If the determination is affirmative, then in step 620 the state is changed to the requested state. Thus, for example, if the current state is a manual operation state 404 and the process operator requests a state change to an automatic production state 412, then if the acceptability index is within its deadband, then the supervisor 262 will transition to an automatic production state 412. Alternatively, if, in step 616, it is determined that the acceptability index is not within its deadband, then in step 624 a message is presented to the process operator, via the display 268, indicating that the state change request is denied. Subsequently, as with all other control flow paths from step 556, step 628 is again encountered.

As an aside, it is worthwhile to note that both state change requests and their subsequent fulfillment or denial are logged to the data acquisition module 274 for analysis of the control system 200 performance.

As mentioned above, in step 628, a determination is made as to whether process tuning is to be considered. That is, if the supervisor 262 is in an emergency state 408 or about to enter an emergency state, then process tuning is inappropriate. However, assuming neither of these conditions hold, in step 632 a determination is made as to whether the acceptability index is within appropriate bounds to make process tuning worthwhile. That is, step 632 determines whether the acceptability index is:

(11.1) outside the [low, high] alarm range;

(11.2) within (11.1), but outside the deadband range; or (11.3) within the deadband range.

Since each control branch from step 632 is associated uniquely with one of the conditions (11.1) through (11.3), each such control branch will be discussed in turn below.

Referring to the control branch associated with condition (11.1), since the acceptability index is within deadband, process tuning is appropriate if the current state is either an automatic production state 412 or an unattended state 416. Thus, in step 636 a determination is made as to whether the supervisor 262 is in one of these states. If not, then no process tuning is attempted and step 504 is next encountered. Otherwise, if the positive control branch from step 636 is taken, decision step 640 is encountered where a determination is made as to whether any previous process tuning changed the execution frequency of an attribute controller. More precisely, if there has been a previous tuning operation affecting an attribute controller execution frequency and the results of this tuning operation have not been analyzed to determine if the execution frequency change resulted in the coal drying process being more stable as measured by a computed "process error," then the execution frequency evaluation indicator referred to in step 640 will be "on." Otherwise, this indicator will be "off."

Figure 6A:
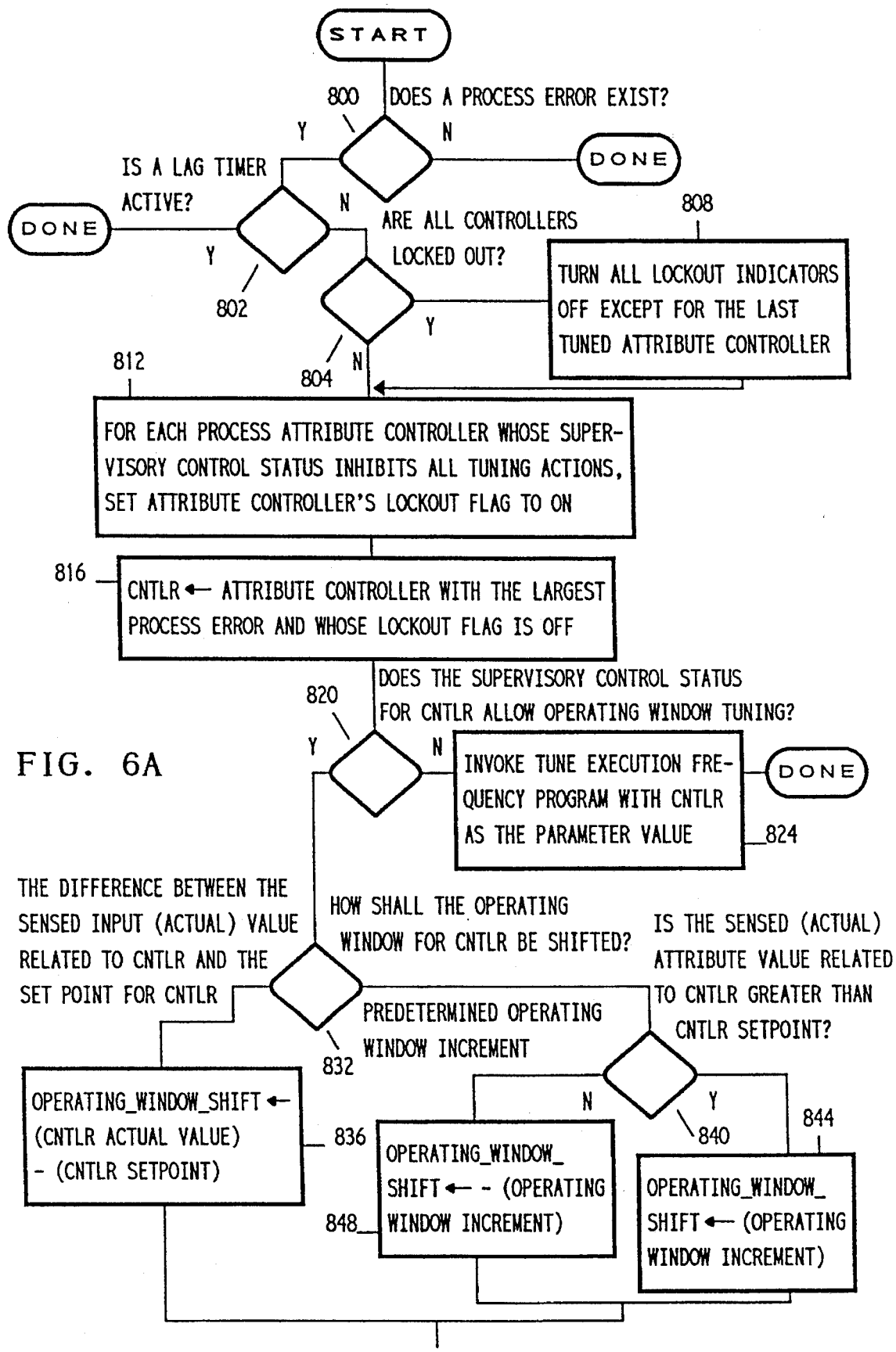
FIGS. 6A–6B are flow charts illustrating the actions of the supervisor 262 when adjusting or tuning process control data by, primarily, shifting the setpoint and deadband of an attribute controller.
Figure 6B:
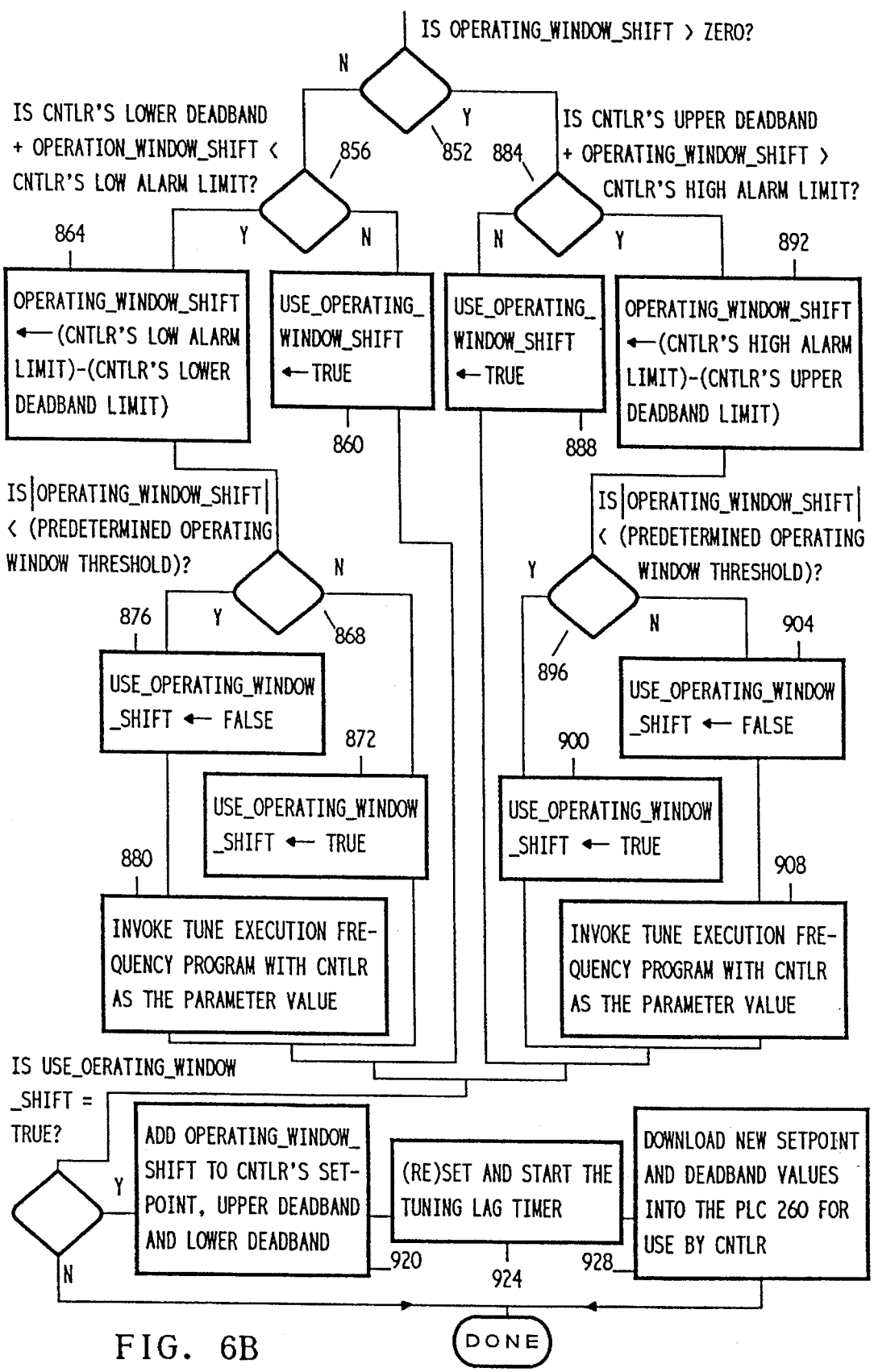
Figure 7A:
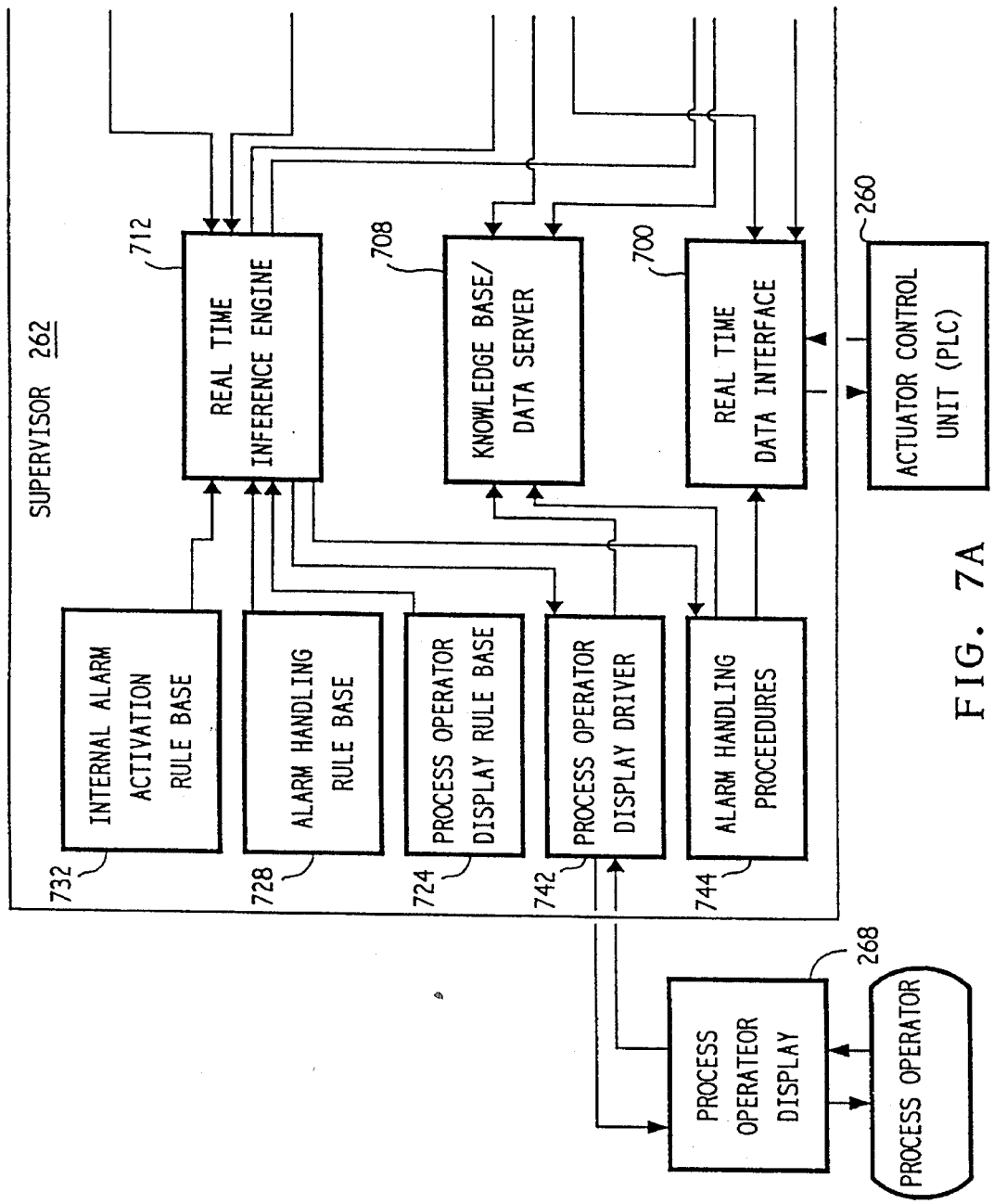
FIGS. 7A–7B are block diagrams presenting the internal structure of the expert system supervisor 262.
Figure 7B:
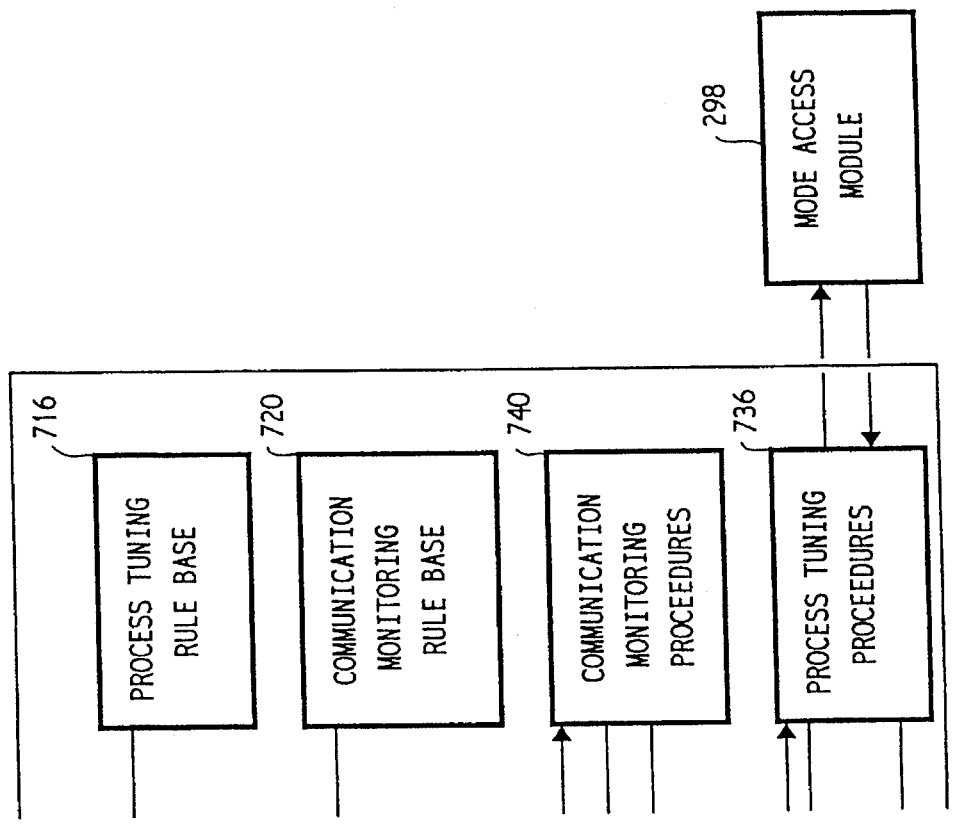

If, in step 640, the execution frequency evaluation indicator is off, then no attribute controller execution frequency analysis is required and in step 644 the tune process program, whose high level steps are presented in FIGS. 6A–6B, is invoked. Briefly, the tuning program of FIGS. 6A–6B first identifies an attribute controller whose tuning control data is to be adjusted. Subsequently, the program attempts to shift the operating window of the identified attribute controller and if that is not possible, then an attempt is made to change the execution frequency of the attribute controller.

Figure 8A:
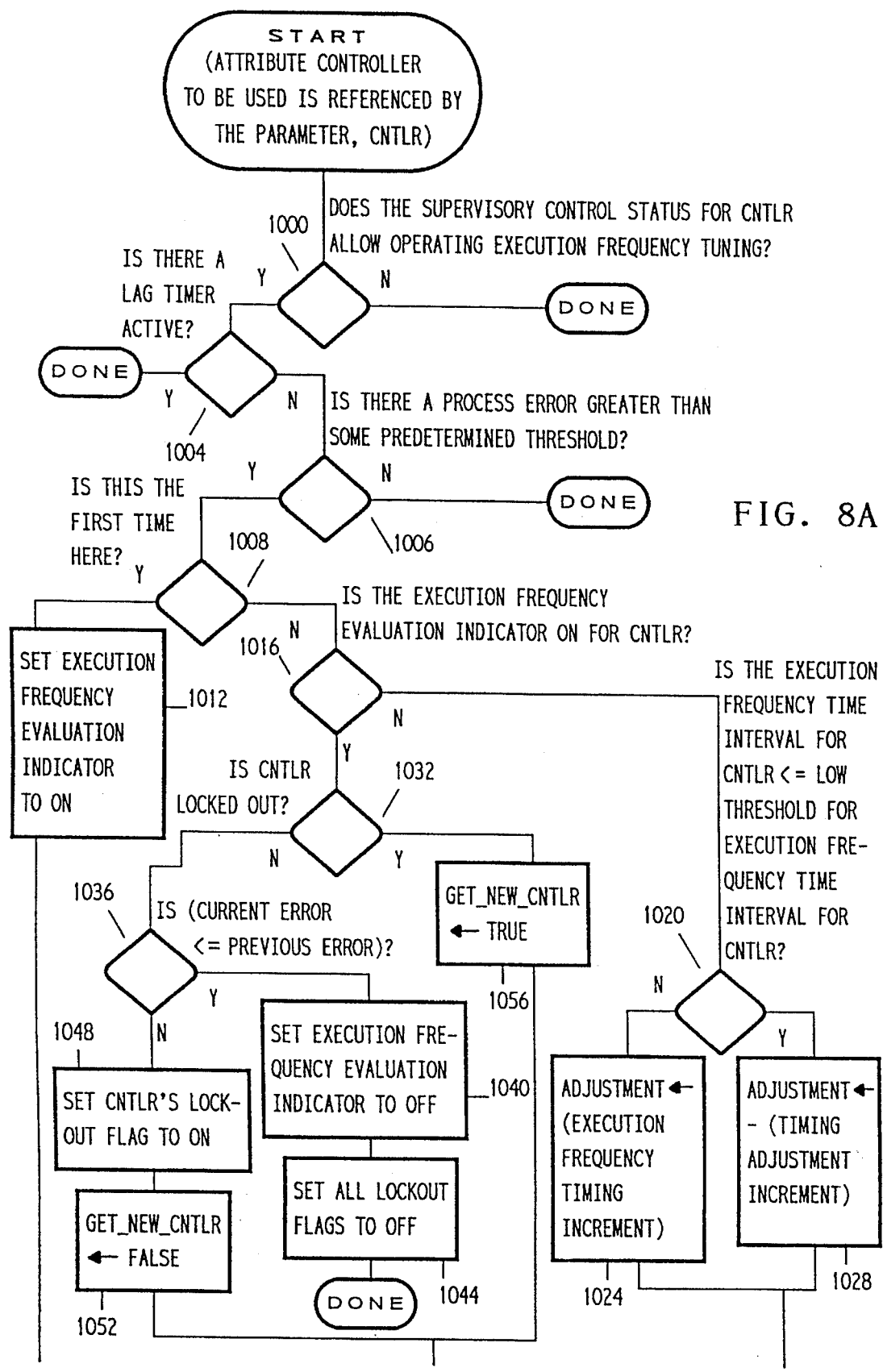
FIGS. 8A–8B are flow charts illustrating the actions of the supervisor 262 when adjusting or tuning process control data by changing the execution frequency of an attribute controller, or evaluating a previous execution frequency change.
Figure 8B:
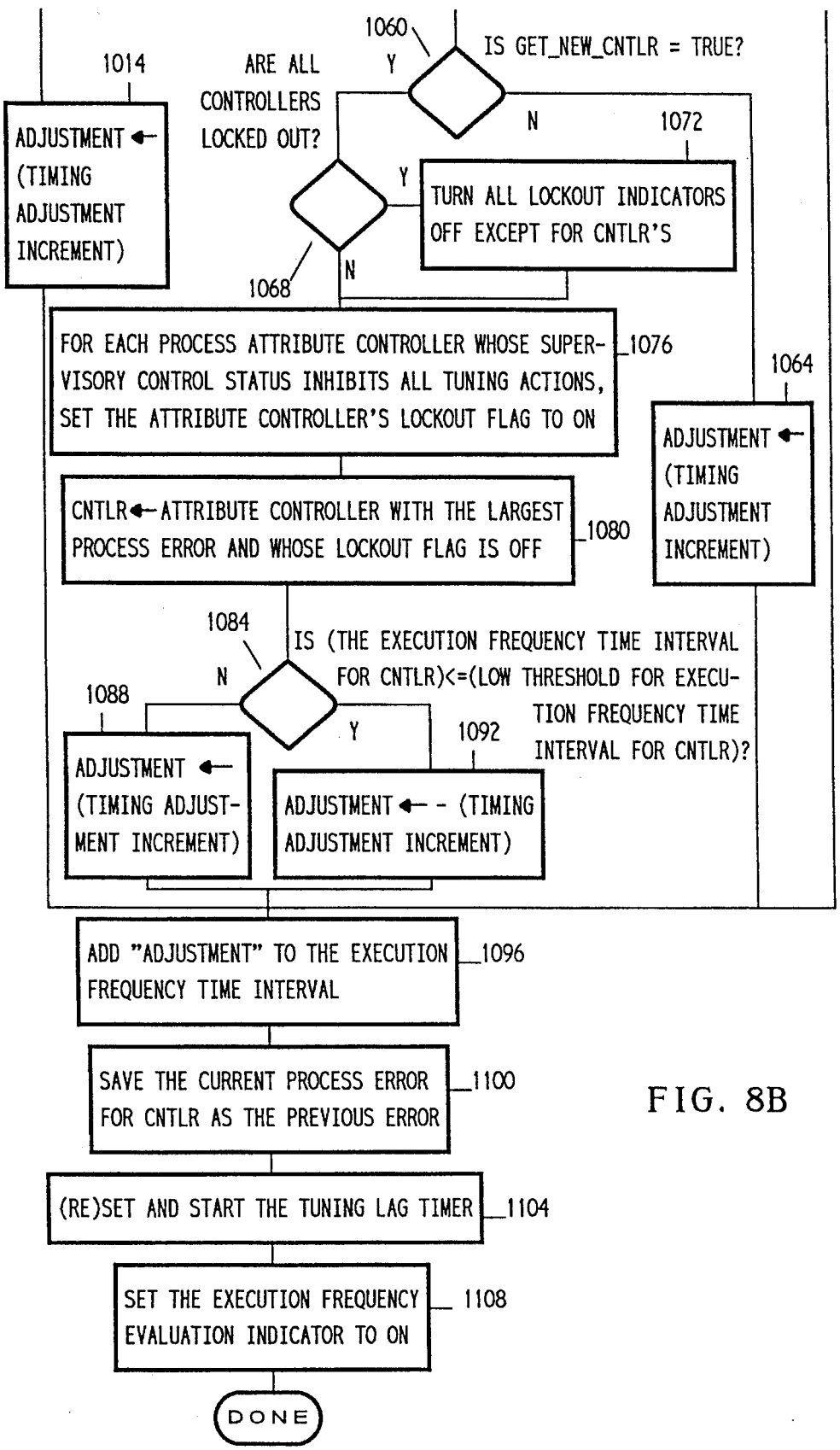

Alternatively, if in step 640 the execution frequency evaluation indicator is on, then in step 648 an execution frequency tuning program, whose high level steps are presented in FIGS. 8A–8B, is invoked. Briefly, the program represented in FIGS. 8A–8B has the responsibility both to analyze previous execution frequency changes to determine their efficacy and, in addition, to change attribute controller execution frequencies. In the context of step 648, the execution frequency tuning program of FIGS. 8A–8B is used to determine the efficacy of a previous execution frequency change. Thus, in step 648 the program is supplied with an input parameter indicating the attribute controller whose previous execution frequency change is to be analyzed. With regard to the latter responsibility of the execution frequency tuning program, note that this program is invoked by the tune process program of step 644 (i.e., FIG. 5E) for changing attribute controller execution frequencies. In this context, the execution frequency tuning program's input parameter specifies the attribute controller upon which an attempt to change its execution frequency is to be made.

Regardless of whether step 644 or step 648 is performed, there is a predetermined lag timer activated to delay further changes to any attribute controllers for a predetermined time interval (modulo circumstances requiring an emergency state change). Thus, no further process control change steps are performed after these steps and step 504 is next encountered.

Returning again to step 632, if a branch corresponding to (11.2) or (11.3) is taken, then, potentially, a new submode from the mode library 276 is supplied to the supervisor 262 to better stabilize the process being controlled. The only difference between the steps below the control branch corresponding to (11.2) and those below the control branch corresponding to (11.3) is step 652 which provides a message to the process operator indicating that the acceptability index is outside the [low, high] alarm range. Thus, regardless of the branch taken when the acceptability index is out of deadband, step 656 is performed wherein a determination is made as to whether the supervisor 262 is in a manual operation state 404. If so, then submodes should not be used and thus no further steps directed at submode use are performed. Alternatively, in step 660, a determination is made as to whether there is an active lag timer delaying further modification of the process control data. If there is an active lag timer, then again no further steps directed at submode use are performed and step 504 is again encountered. Alternatively, if no lag timer is active, then in step 664 a determination is made as to whether there is a new submode available to replace the current (sub)mode. If no submode is available, then no further processing here is accomplished and 504 is next encountered. Otherwise, if a new submode is available, then in step 668 the new submode's setpoint, deadband and execution frequency for each attribute controller are downloaded into the PLC 260 for use by the attribute controllers. Subsequently, in step 672, the supervisor 262 switches to using the alarm ranges of the new submode and in step 676 a lag timer is activated for preferably 15 minutes, thereby allowing the process time to stabilize with the new submode values before further process control changes are undertaken. To complete submode replacement, in step 680, the stability error for the outgoing accessed (sub)mode is determined and associated with the copy of this (sub)mode residing in the mode repository 294. Note, this step is identical to step 548. Finally, as with all other control flow paths, execution control loops back to step 504 in preparation for the next iteration of the loop steps 504 through 680.

Referring now to FIGS. 6A–6B, flow charts for step 644 of FIG. 5E is presented. That is, these flow charts determine:

(a) in steps 800 through 802, whether any attribute controller is to have its process control data tuned;

(b) in steps 804 through 816, which attribute controller is to be tuned;

(c) in steps 820 through 824, which type of tuning to perform, either operating window shifting or execution frequency changing;

(d) in steps 832 through 908, if operating window shifting is to be done, then a determination of the shift is made;

(e) in steps 916 through 928, if the operating window shift is to be done, then the operating window of the selected attribute controller is shifted.

Each one of the sections (a) through (e) will now be discussed.

With regard to steps 800 through 802, step 800 determines whether there is a so-called "process error" of sufficient size to require process tuning. In the present embodiment, this error is determined as follows:

$$\left( \sum_{i=1}^{NE} \sum_{j=1}^{NC} \left( \frac{|SP_j - A_j| * W_j}{0.5 * DB_j} \right) \right) / NE$$

where $SP_j$, $A_j$, $W_j$ and $DB_j$ are the same as previously defined, and NE= the number of evaluations of the inner summation since the last process control data change occurred. Thus, this error is an average of the process error snap shots since the last process control data change occurred. Subsequently, if an error of sufficient magnitude is determined, then in step 802 a determination is made as to whether a previous tuning or (sub)mode change operation has recently occurred. That is, a determination is made as to whether: (a) a tuning lag timer is currently active; or (b) the (sub)mode stabilization lag timer (step 676, FIG. 5E) is currently active, since either lag timer blocks any further tuning operations until both lag timers are no longer active. Note that currently, the tuning lag timer remains active for 5 minutes at a time.

With regard to steps 804 through 816, it is worthwhile to note that certain attribute controllers should not be considered as candidates for tuning operations. With this in mind, each attribute controller has a "lock out" flag which is set if and only if the attribute controller is not to be considered for the next tuning operation. Since there are a substantial number of attribute controllers (e.g., greater than 10), steps 804 and 808 assure that there are a sufficient number of attribute controllers not locked out. Further, note that each (sub)mode specifies the manner in which each attribute controller can be tuned. That is, each (sub)mode includes a supervisory control status for each attribute controller whereby this status indicates whether the attribute controller can be tuned by: (a) only shifting its operating window; (b) only changing its execution frequency; (c) enabling both; and (d) inhibiting both tuning operations. Thus, step 812 assures that any attribute controllers, having a supervisory control status set for inhibiting all tuning actions, are locked out. Subsequently, in step 816 an attribute controller is selected from the remaining such controllers that are not locked out. (Of course, in the unlikely event that no such controllers remain, then this program will exit.) In particular, step 816 selects an attribute controller with the largest "controller error" as defined by the following equation:

$$\frac{(SP_j - A_j)}{0.5 * DB_j}$$

where $SP_j$, $A_j$ and $DB_j$ are as previously defined with respect to the $j^{th}$ attribute controller.

With reference to steps 820 through 824, note that if the attribute controller, CNTLR, selected for tuning cannot have its operating window shifted, then the execution frequency tuning program (of FIGS. 8A–8B), also invoked in step 648 of FIG. 5E, is invoked here. Further, note that the selected attribute controller, CNTLR, is supplied to the execution frequency tuning program.

With regard to steps 832 through 908, note that each (sub)mode includes, for each active attribute controller, an operating window shift increment field specifying either a predetermined increment by which the operating window of the attribute controller is to be shifted, or an indication that the operating window can be shifted by a variable amount, typically by an amount sufficient to cause the setpoint to equal the actual value of the process attribute controlled by the attribute controller. Thus, in step 832 a determination is made as to how the operating window for CNTLR is to be shifted. Subsequently, either step 836 calculates the operating window shift required to cause the setpoint of CNTLR to be identical to its actual value, or steps 840 through 848 calculate the operating window shift caused by a specific shift increment. It should be noted that preferably for most attribute controllers a predetermined shift increment is supplied. Moreover, each such increment is intended to be small in comparison to the related deadband width (e.g., 1/200 of the deadband width).

Subsequently, in steps 852 through 908, a determination is made as to whether the operating window shift calculated in steps 832 through 848 results in a new setpoint that is within the [low, high] alarm range for CNTLR. If not, then in step 864 or 892 a new operating window shift increment is determined, and if the size of this new shift increment is not greater than a predetermined threshold (step 868 or 896), then instead of changing the operating window for CNTLR, the execution frequency tuning program of FIGS. 8A–8B is invoked (step 880 or 908).

Finally, in steps 916 through 928, if operating window tuning is still to be done, then the CNTLR's setpoint and deadband are shifted (steps 920 and 928) and the tuning lag timer is activated for at least 5 minutes (step 924).

In FIGS. 8A–8B flow charts are presented of the steps performed when changing the execution frequency of an attribute controller or determining the effect of a previous execution frequency change. To accomplish this, the Tune Execution Frequency program of FIGS. 8A–8B is provided with a value for the input parameter, CNTLR, designating the attribute controller to which the steps of FIGS. 8A–8B are at least initially directed.

In steps 1000 through 1006, various determinations are made as to whether execution frequency tuning should be performed. In step 1000, a determination is made as to whether the (sub)mode currently accessed by the supervisor 262 allows the attribute controller, CNTLR, to have its execution frequency tuned. In step 1004, a determination is made as to whether there is an active timer preventing execution frequency tuning. In step 1006, a determination is made as to whether the process error is sufficiently large to warrant execution frequency tuning. Note that in making the determination in step 1006, the process error is determined in the same manner as in step 800 of FIG. 6A.

Subsequently in step 1008, a determination is made as to whether the present execution of this step is the very first time it has been encountered while the process control system 200 has been in operation. If so, then CNTLR can only have been supplied to this program for changing its execution frequency. Thus, in step 1014 the variable, ADJUSTMENT, is assigned a value designating a change in the time interval between executions of CNTLR. More precisely, the variable ADJUSTMENT is assigned, in this case, a predetermined execution frequency timing increment. This increment is preferably negative, such that when added to the present execution frequency timing interval as in step 1096, the execution frequency for CNTLR increases. However, it should be noted that it is desirable to modify execution frequencies by relatively small amounts so as not to increase any present process instability. That is, since the timing interval between consecutive executions of an attribute controller is in the range of 15 seconds to 5 minutes, the present execution frequency timing increment is preferred to be −0.1 seconds.

Thus, once a value for ADJUSTMENT is assigned in step 1014, then in steps 1096 through 1108, the execution frequency time interval for CNTLR is changed (step 1096), the current process error referenced in step 1006 is saved (step 1100) for use in determining if the present change is useful and the tuning lag timer is activated (step 1104). Finally, in step 1108, the execution frequency evaluation indicator is set to on. Note that the execution frequency evaluation indicator is set on if an only if there is a previous execution frequency change for an attribute controller that is to be evaluated to determine if the change succeeded in decreasing the process error.

Returning now to step 1008, for all encounters with this step beyond the initial encounter, the negative control branch is taken. In step 1016 a determination is made as to whether a previous execution frequency change is to be evaluated. If not, then in steps 1020 through 1028, a value is determined for the variable, ADJUSTMENT. Note that whenever possible the time interval or period of the execution frequency of CNTLR is to be decreased. That is, in step 1024, ADJUSTMENT is assigned the value of the execution frequency timing increment as in step 1014. However, for each attribute controller the (sub)mode currently accessed by the supervisor 262 supplies a low threshold for the execution frequency time interval whereby the interval between consecutive executions of the attribute controller should not fall substantially below. Thus, if in step 1020 a determination is made that if the time interval between consecutive executions for CNTLR is less than or equal to this low threshold, then the variable, ADJUSTMENT, is assigned, in step 1028, the positive value corresponding to the execution frequency timing increment (i.e., +0.1 seconds). Subsequently, steps 1096 through 1108 are performed as described above.

Returning now to step 1016, if the execution frequency evaluation indicator is on, then in step 1032 a determination is made as to whether CNTLR's lock out flag is set to on. In this context, the lock out flag for CNTLR is an additional filter to determine whether a previous CNTLR execution frequency change is to be evaluated. Note, there are three possibilities: the previous execution frequency change decreased the process error (steps 1036 through 1044), the previous execution frequency change increased the process error (steps 1036 through 1052), and CNTLR is locked out due to a previous execution frequency change combined with a reinstating of CNTLR's execution frequency value prior to the change. Thus, in this latter scenario, a new attribute controller for execution frequency tuning is requested (step 1056).

Consequently, as one skilled in the art can determine, in steps 1060 through 1092, if necessary, a new attribute is assigned to CNTLR. Following these steps, steps 1096 through 1108 are again encountered whereby CNTLR's execution frequency is modified.

Figure 9:
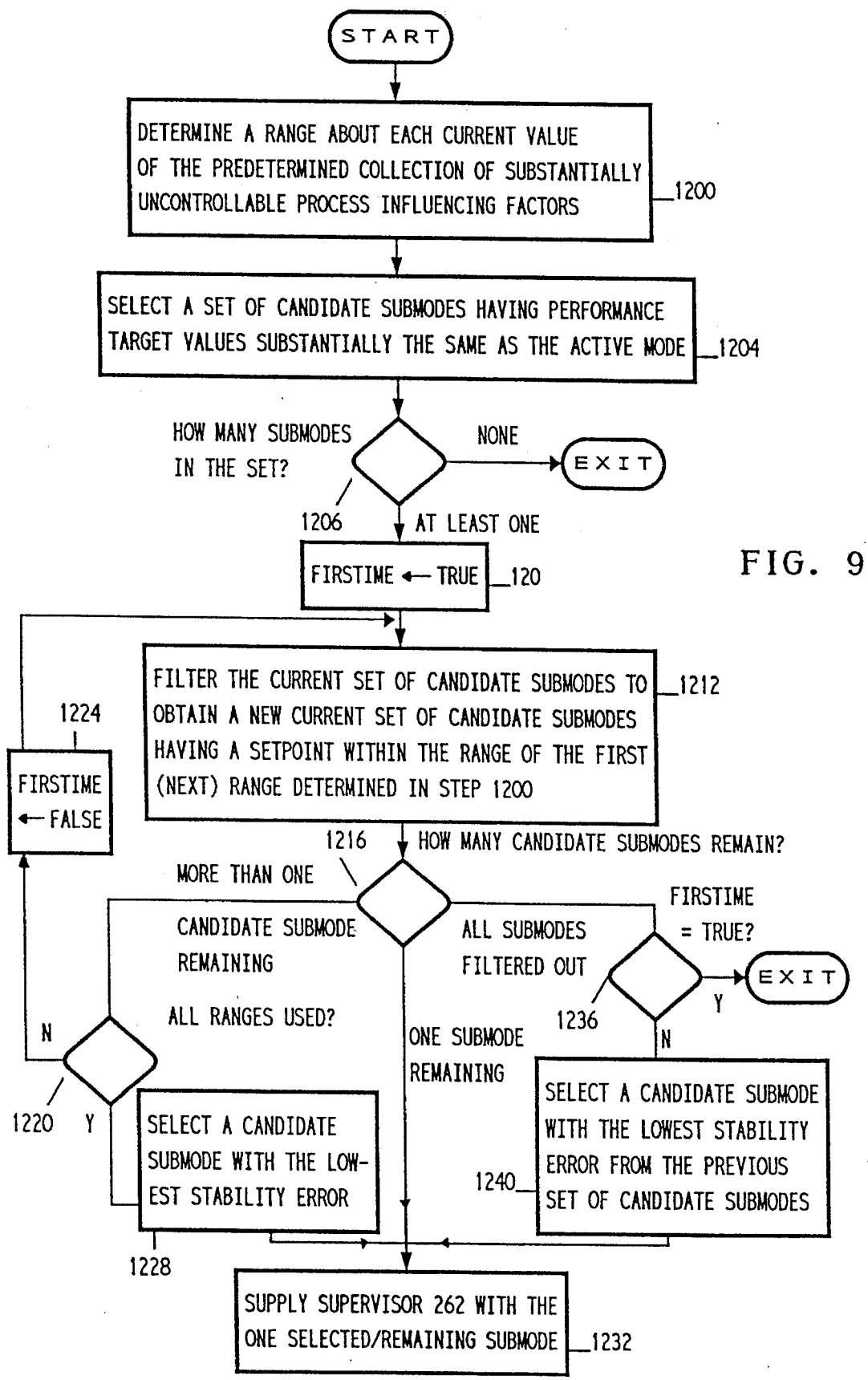
FIG. 9 presents a flow chart of the algorithm used by the mode access module 298 when retrieving a submode from the mode repository 294.

In FIG. 9 a flowchart is presented providing a high level description of the program used by the mode access module 298 in supplying an alternative submode from the mode repository 294 to the supervisor 262. In step 1200 a range is determined about the current value of each predetermined substantially uncontrollable process influencing factor. That is, for the coal drying process a range is determined for each of a predetermined set of the substantially uncontrollable process influencing factors (7.12) and (7.13). Note that such range determinations can depend on range data in the currently accessed (sub)mode. In the current embodiment, for each substantially uncontrollable process influencing factor, the range is determined by: (a) determining a value corresponding to 2.5% of the typical range for the process influencing factor; and (b) adding and subtracting the determined value from the current value for the influencing factor. In step 1204 a set of candidate submodes that have performance target values within 2.5% of the active mode are selected. Of course, the candidate submodes must not be flagged for deletion from the mode library 276, and no candidate submode can be the currently accessed (sub)mode. Subsequently, in step 1206, a determination is made as to whether the set of submodes is empty. If not, then step 1208 is encountered where the variable, FIRSTIME, is set. This variable is used in step 1236 to determine if the loop of steps 1212, 1216, 1220 and 1224 has been performed at least once. Following step 1208, in step 1212 an additional selection process is performed wherein to remain a candidate for the submode to be supplied to the supervisor 262, the present candidate submodes are filtered by the above determined ranges on the substantially uncontrollable process influencing factors. That is, the ranges determined in step 1200 are ordered such that the ranges for the more important substantially uncontrollable processing influencing factors occur earlier in the ordering. Thus, on each iteration of the loop of steps 1212, 1216, 1220 and 1224, the next most important range not already used as a filter is used to filter the remaining candidate submodes. Note that in the present embodiment, the order for the substantially uncontrollable process influencing factor ranges is: ambient air temperature range, input coal moisture content range, barometric pressure range, humidity range, and input coal particle size distribution range. However, additional ranges for other factors of (7.12) are contemplated to be added.

Thus, the loop of steps 1212, 1216, 1220 and 1224 is iteratively performed until: (a) a single submode remains which can be supplied to the supervisor 262; (b) all ranges have been used in which case a candidate submode with the lowest stability error is supplied to the supervisor 262 (steps 1228, 1232); or (c) the set of candidate submodes becomes empty on an execution of step 1212 beyond the first execution. Note, in this latter case, a candidate submode is selected from the immediately previous set of candidate submodes (step 1240).

Figure 10:
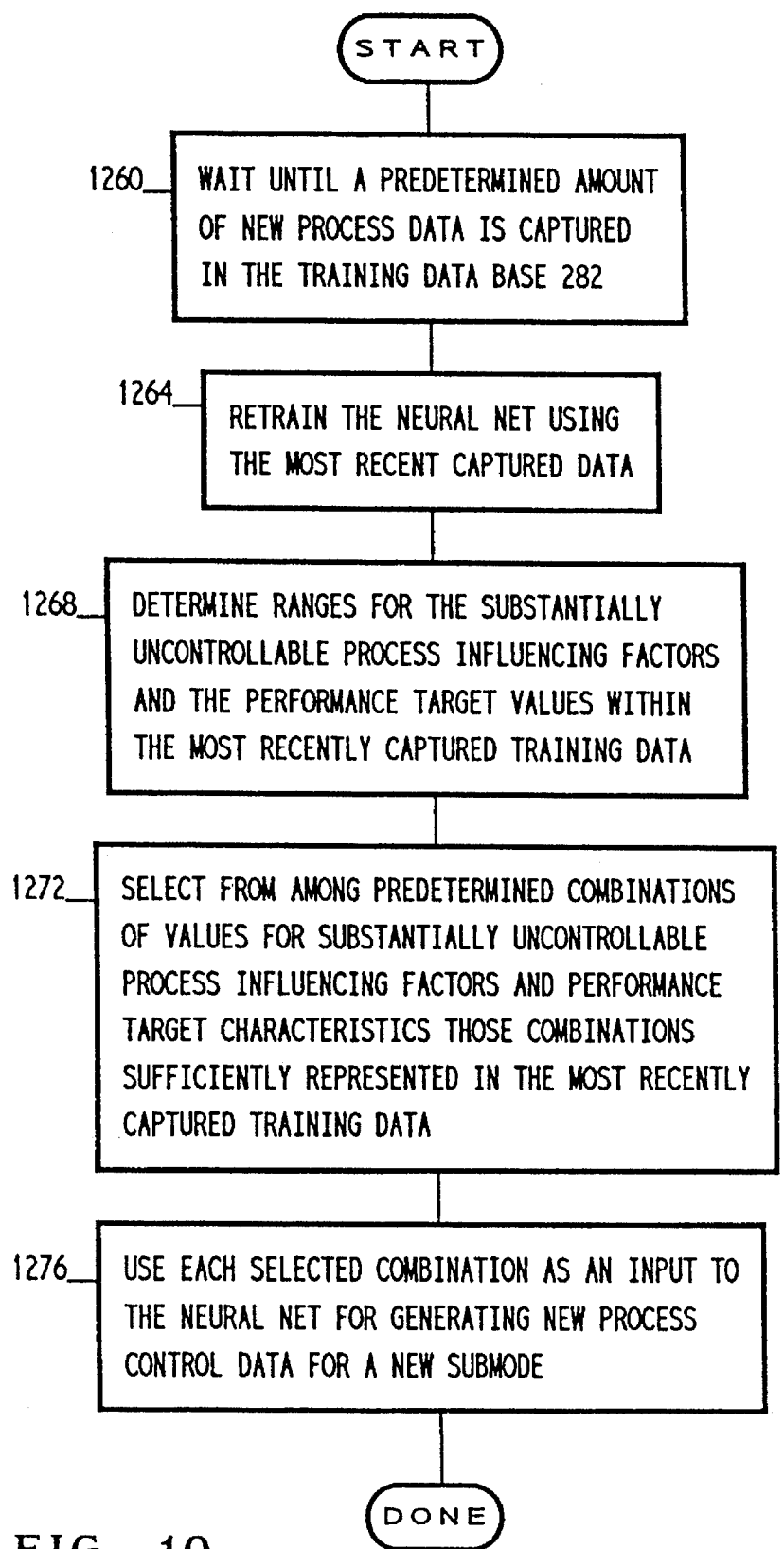
FIG. 10 presents a flowchart of the algorithm used by the learning unit 212 when supplying input to the neural net.

In FIG. 10, the high level steps are given for the program invoked by the learning unit 212 to substantially automatically generate new process control data for a new submode. In step 1260, the program waits until a predetermined amount of new process data is captured in the training data base 282. Preferably, this amount corresponds to the process data captured within 4 hours of coal drying processing. Thus, every 4 hours while the coal drying facility 10 is drying coal, the steps of FIG. 10 are performed. In step 1264, the neural net module 278 has its (previously trained) neural net retrained with the newly captured process data such that any recent process and/or environmental peculiarities can be learned. In step 1268, a range is determined for each of the substantially uncontrollable process influencing factors and each of the performance target characteristics represented in the newly captured data. Preferably, each range is composed of the interval from the smallest value encountered to the largest value encountered. However, other ranges are also possible. In step 1272, each combination in a collection of predetermined combinations of values for the substantially uncontrollable process influencing factors and the performance target characteristics is examined to determine whether the combination is within substantially every range determined in step 1268. That is, for each such combination substantially every value within the combination is compared with the related range determined in step 1268, and if the values are within the ranges, then the combination is selected. Finally, in step 1276 each selected combination is used as an input to the retained neural net in order to obtain new control data for a new submode.

Figure 11A:
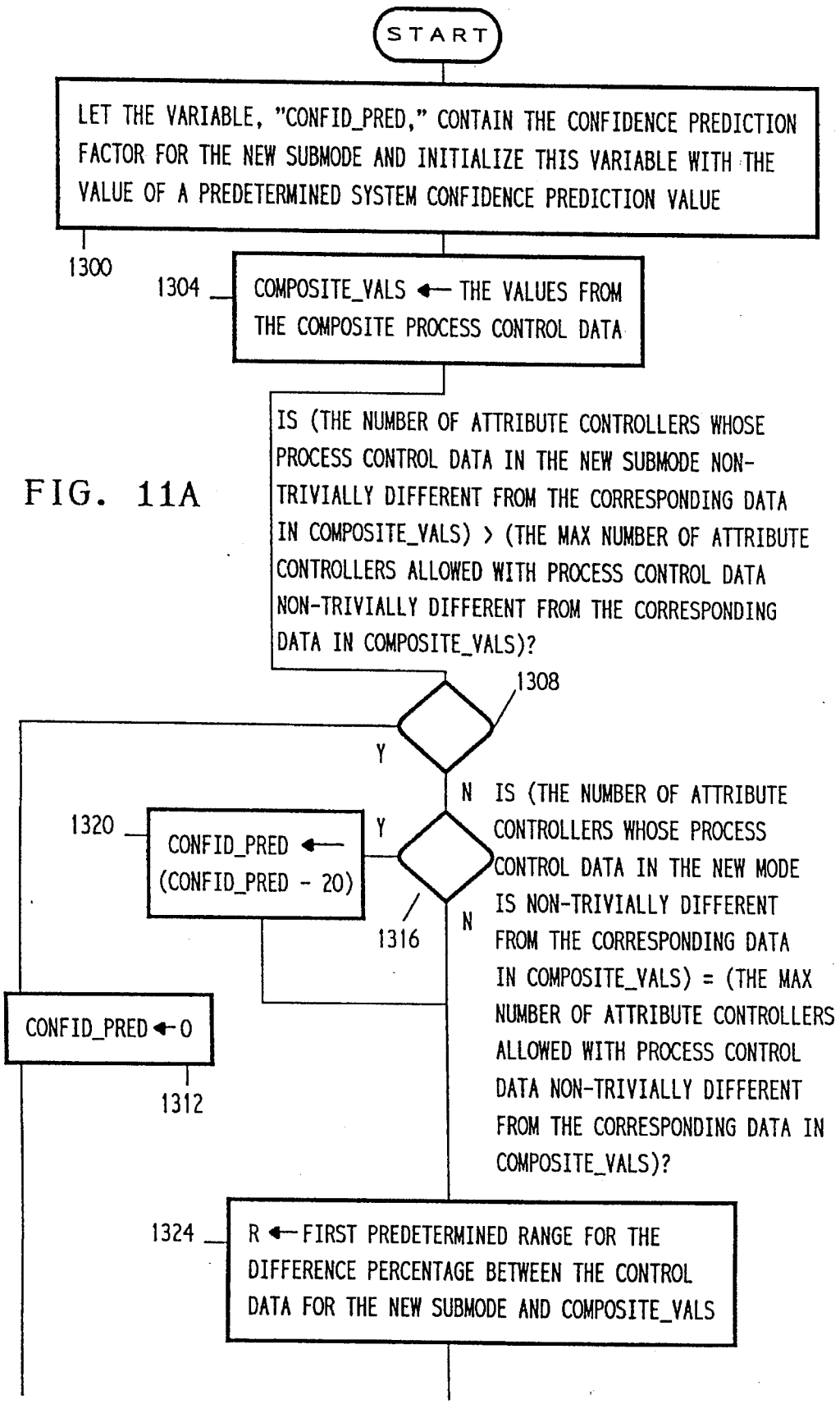
FIGS. 11A–11B present flow charts of the algorithm used by the submode generator/filter 290 when determining whether a newly generated submode should be added to the mode repository 294.
Figure 11B:
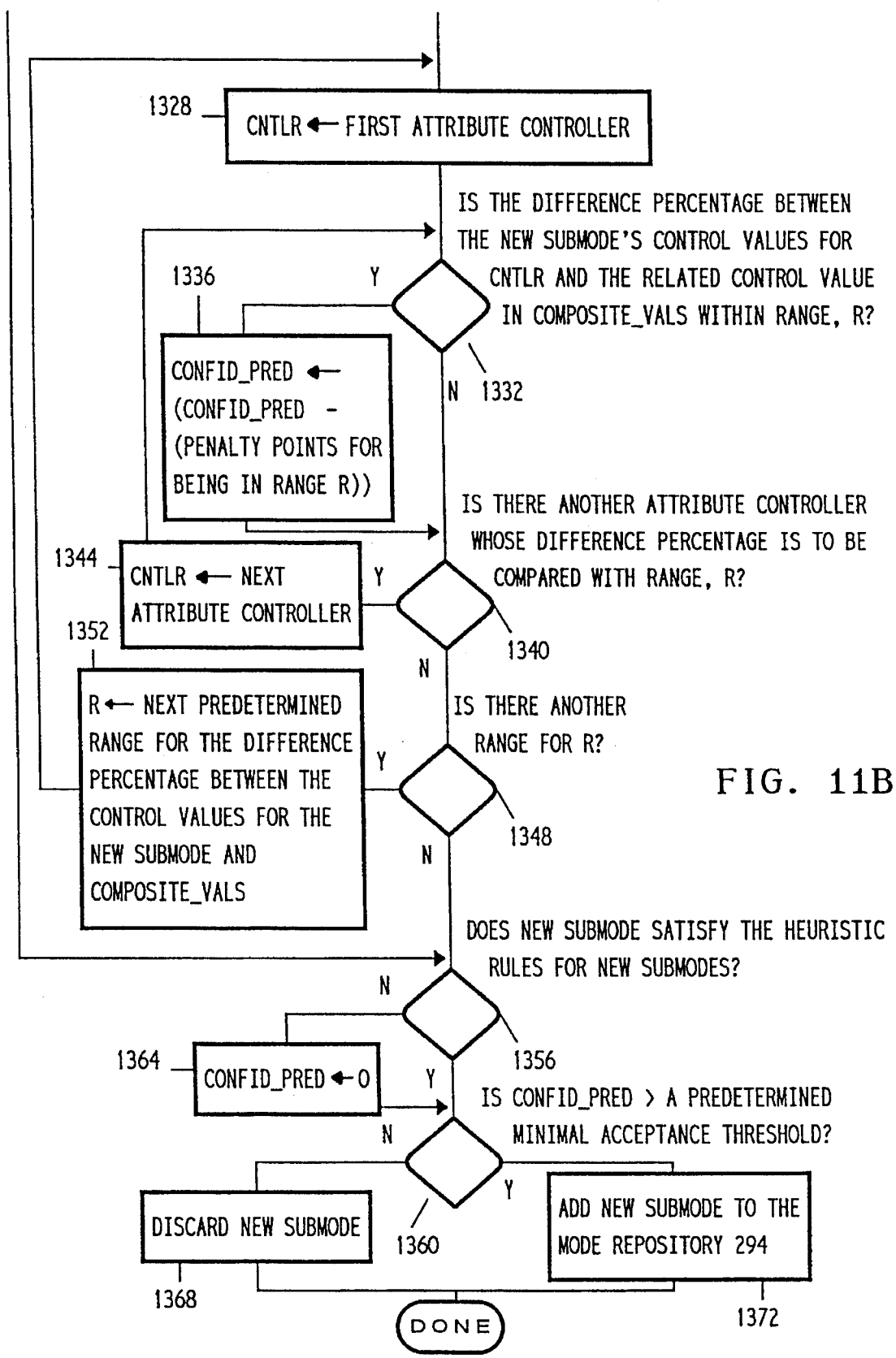

With reference to FIGS. 11A–11B, flow charts are presented of the program used by the submode generator/filter 290 in determining whether a newly generated submode is considered sufficiently acceptable such that the new submode can be inserted into the mode library 276. However, before describing this flowchart, some background discussion is worthwhile. In particular, it has been determined that a central aspect in predicting the performance of a new submode is that the process control data of a new submode should not be substantially different from the process control data of "similar" (sub)modes, i.e., (sub)modes having substantially the same performance target values and substantially the same values for the substantially uncontrollable process influencing factors. To accomplish this, the process data captured in step 1260 of FIG. 10, used in retraining of the neural net, is also used here. That is, for a newly generated submode, the process control data within the captured process data that was used in obtaining the new mode's process control data is used. More precisely, for each newly generated submode, the process control data within the related captured process retraining data is used to determine a "composite" process control data set and the composite process control data set is compared with the process control data of the submode to determine similarity. In one embodiment, if the captured control data has little variation, each derived value in the composite process control data set is merely an average of the related values in the captured control data. Thus, this composite process control data set is used in the steps of FIGS. 11A–11B as the standard to determine whether the process control data of the new submode is sufficiently similar to submodes currently being accessed by the supervisor 262. In particular, the composite process control data set contains composite setpoint values and composite deadband values.

Briefly, the program of FIGS. 11A–11B computes a confidence prediction factor for each new submode provided as input to the program. The value of the confidence prediction factor is stored in the program variable "CONFID_PRED" which, in the current embodiment, is initially assigned a value of 100, this value being both the highest value possible for CONFID_PRED and a value which presupposes that the new submode is acceptable unless further analysis indicates otherwise. The program analyzes a new submode and decrements the value of CONFID_PRED by a predetermined number of "penalty points" for each property of the new submode deemed to decrease the expected success of the submode in safely achieving its related performance target values when the new submode is accessed by the supervisor 262. Subsequently, a collection of heuristic rules are also applied to evaluate the new submode. Finally the resulting value for the confidence prediction factor in CONFID_PRED is used to determine if the new submode is to be added to the mode library 276.

With the above comments in mind, the steps of FIGS. 11A–11B will now be discussed. Steps 1300 and 1304 are initialization steps. That is, the variable CONFID_PRED is set to 100 (step 1300) and the variable COMPOSITE_VALS is assigned a data structure containing all values from the composite process control data set. Subsequently, in steps 1308 and 1316, comparisons are made between: (a) the number of attribute controllers whose process control data in the new submode is non-trivially different from the corresponding data in COMPOSITE_VALS, and (b) a predetermined maximum number of attribute controllers having such non-trivial differences. (Note that a non-trivial difference in the present context denotes a difference in the value of at least one field between two data records whereby the difference is greater than a predetermined small constant used to equate floating point numbers that are different substantially due to computer inaccuracies in floating point number representation and arithmetic operations.) Thus, if there are too many attribute controllers with non-trivially different process control data, then in step 1312 the confidence prediction value is set to zero, thereby indicating that there is no confidence the new submode will perform acceptably. Alternatively, if the test in step 1316 is affirmative, then twenty penalty points are deducted from the confidence prediction factor in step 1320.

In steps 1324 through 1352, a determination is made, for each attribute controller, as to how much different the attribute controller's process control values in the new submode are from the corresponding values in COMPOSITE_VALS and a larger number of penalty points are deducted from the confidence prediction factor for larger differences. In determining the degree of difference between the process control values for a new submode and the values in COMPOSITE_VALS, the difference is measured in terms of a percentage value, denoted hereinafter a "difference percentage." That is, for each attribute controller the difference between its setpoint value in the new submode and the setpoint value in COMPOSITE_VALS is measured as a percentage of the width of the related deadband in COMPOSITE_VALS.

In determining the number of penalty points for a difference percentage, there are predetermined non-overlapping percentage ranges established such that each difference percentage falls within exactly one percentage range. Presently, the ranges are: [0,1], (1,2], (2,3], (3,5], (5,10] and (10,100] where a square bracket denotes end point inclusion and a parenthesis denotes end point exclusion. Associated with each percentage range is a predetermined number of penalty points to be deducted from the value of the confidence prediction factor when the difference percentage for an attribute controller falls within the percentage range. Thus, by iteratively picking a percentage range (steps 1324 and 1352) and for each picked range, iterating through the attribute controllers (steps 1328 and 1344) each difference percentage is tested (step 1332) and if the difference percentage is within the currently picked percentage range then the related penalty points are deducted (step 1336).

Following the above steps, in step 1356, a predetermined collection of heuristic rules are executed which may increase or decrease the new submode's confidence prediction factor value. Subsequently, in step 1360, a determination is made as to whether the value of the confidence prediction factor is greater than some predetermined threshold. Currently, this threshold is sixty-nine. If the confidence prediction factor is not above this threshold, then in step 1368 the new submode is discarded. Otherwise, the new submode is added to the mode repository 294 in step 1372.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art are within the scope of the present invention. The embodiment described hereinabove is further intended to explain the best mode presently known of practicing the invention and to enable others skilled in the art to utilize the invention as such, or in other embodiments, and with the various modification required by their particular application or uses of the invention. It is intended that the appended claims be construed to include alternative embodiments to the extent permitted by the prior art.

What is claimed is:

1. An automated control processing method comprising the steps of:

conducting a process which is controlled as said process is performed;

establishing, within a learning means, at least one learned relationship between data for at least a first process control parameter for controlling said process, and data for at least a first process influencing factor, said learning means receiving process training data output in said step of conducting;

generating at least a first data cluster, said first data cluster generated from an output of said learning means, said first data cluster including first control data related to said first process control parameter and including first applicability data related to said first process influencing factor for determining when said control data is to be used in controlling said process;

entering said first data cluster into a plurality of stored data clusters, each said data cluster having control data related to said first process control parameter and applicability data related to said first process influencing factor for determining when said control data is to be used in controlling said process;

controlling said process using said first data cluster as an accessed data cluster obtained from said plurality of stored data clusters;

post-filtering said plurality of stored data clusters to retain said first data cluster when used as said accessed data cluster and said process has acceptable performance.

2. A method as claimed in claim 1, wherein said process includes a drying of coal.

3. A method as claimed in claim 2, wherein the control data of said first data cluster includes one of a setpoint, a deadband, an execution frequency and alarm data related to an attribute controller for controlling one of: free oxygen within a heat transport gas, a drying chamber temperature, a deck pressure differential and an exhaust fan temperature.

4. A method as claimed in claim 2, wherein said step of conducting includes deluging said process with water when the process enters an emergency state.

5. A method as claimed in claim 1, wherein said step of conducting includes triggering an automated telephone call to at least one predetermined person upon detecting a critical alarm situation while said process is in an unattended state.

6. A method as claimed in claim 1, wherein said step of conducting includes at least one of filtering and transforming data output from said process into process training data.

7. A method as claimed in claim 1, wherein said first data cluster includes values for one or more of the following: a deadband, a setpoint, an execution frequency and an alarm range.

8. A method as claimed in claim 1, wherein said first data cluster includes one or more of the following: a data acquisition switch, a lag time, a delay time, trending time attributes, an in-service indicator and use delay attributes.

9. A method as claimed in claim 1, wherein said first process influencing factor has an uncontrolled variation that influences the process sufficiently so that the process is controlled to accommodate the uncontrolled variation.

10. A method as claimed in claim 9, wherein, whenever the process includes drying of coal, said first process influencing factor is one of: ambient temperature, windspeed, wind direction, humidity, barometric pressure, moisture content of coal to be dried, temperature of coal to be dried and particle size of coal to be dried.

11. A method as claimed in claim 9, wherein said step of controlling includes obtaining process measurement data for at least one process sensor related to said first process influencing factor.

12. A method as claimed in claim 1, wherein said step of controlling includes periodically calculating an acceptability index for determining at least one of whether a process measurement is outside a predetermined deadband and whether a measurement of a characteristic for a product produced by the process is outside a predetermined range.

13. A method as claimed in claim 1, wherein the said first data cluster is related to predetermined performance target data for comparing with product characteristic data obtained from at least one measurement of a product produced by the process, thereby to determine at least one of the quantity and quality of said product.

14. A method as claimed in claim 13, wherein whenever the process includes a drying of coal, said predetermined performance target data includes one or more values of: moisture content of coal dried, amount of coal dried, percentage of free oxygen in a heat transport gas, a drying chamber temperature and an exhaust fan temperature.

15. A method as claimed in claim 1, wherein said step of entering includes associating said first data cluster with a process commencing data cluster contained in said plurality of stored data clusters, said process commencing data cluster used for commencing processing to obtain a product with predetermined product characteristics from said process, said process commencing data cluster having predetermined first target data related to the predetermined product characteristics, said first data cluster having predetermined second target data related to the predetermined product characteristics, said first target data and said second target data having only differences that are inconsequential to said step of controlling.

16. A method as claimed in claim 15, wherein whenever said accessed data cluster is said first data cluster, then a data cluster used as said accessed data cluster immediately previously to said first data cluster is one of: said process commencing data cluster and a second data cluster associated to said process commencing data cluster by said step of associating.

17. A method as claimed in claim 15, wherein said first data cluster includes a submode and said process commencing data cluster includes a mode.

18. A method as claimed in claim 1, wherein said step of controlling includes adjusting a first control value of said first control data of said first data cluster such that said first control value is closer to a related process measurement.

19. A method as claimed in claim 18, wherein said first control value is one of a setpoint and a deadband value.

20. A method as claimed in claim 18, wherein, whenever the process includes a drying of coal, said process measurement includes one of free oxygen gas content of a heat transport gas, a drying chamber temperature, a deck pressure differential and an exhaust fan temperature.

21. A method as claimed in claim 1, wherein said first process influencing factor is controlled sufficiently so that uncontrolled variations in said first process influencing factor do not influence the process sufficiently to warrant controlling the process to accommodate the uncontrolled variation.

22. A method as claimed in claim 21, wherein whenever the process includes drying of coal, said first process influencing factor is one of: drying chamber temperature, and free oxygen content of a heat transport gas.

23. A method as claimed in claim 1, wherein said step of controlling includes changing an execution frequency of an attribute controller to increase process stability.

24. A method, as claimed in claim 1, wherein said step of controlling includes selecting said first data cluster as said accessed data cluster by comparing said first applicability data with data related to measurement(s) of said first process influencing factor.

25. A method as claimed in claim 1, wherein said step of establishing includes supplying said learning means with training data including one or more of: process sensor related data, product characteristic related data for a product output from the process, and process control related data.

26. A method as claimed in claim 1, wherein said step of post-filtering includes determining a process performance measurement of said first data cluster, said process performance measurement being a function of at least one of: a number of times a process attribute is detected as deviating from a related setpoint, a size of each such deviation, and a deadband for the process attribute.

27. A method as claimed in claim 1, wherein said step of entering includes the step of pre-filtering said first data cluster prior to using said first data cluster as said accessed data cluster.

28. A method as claimed in claim 27, wherein said step of pre-filtering includes determining a confidence prediction value for said first data cluster, said confidence prediction value indicative of an expected performance of said first data cluster.

29. A method as claimed in claim 28, wherein said step of determining includes deriving said confidence prediction value by determining a measurement of a difference between said first control data and predetermined composite control data derived from said process training data.

30. A method as claimed in claim 27, wherein said step of pre-filtering includes determining if said first data cluster is sufficiently distinct from every data cluster included in said plurality of stored data clusters.

31. A coal drying control processing method comprising the steps of:

controlling a coal drying process in real time using control data from a first data cluster derived from an output of a learning unit;

obtaining a second data cluster from a plurality of stored data clusters for controlling the coal drying process, said second data cluster also having control data to be used in said controlling step, each data cluster of said plurality of data clusters being derived from an output of said learning unit;

said step of obtaining including comparing a first value obtained from control data in said first data cluster with a second value obtained from control data in said second data cluster;

supplying said second data cluster to said controlling step.

32. A method as claimed in claim 31, wherein said step of controlling includes adjusting a setpoint closer to a measured value of a related process attribute to increase process stability.

33. A method as claimed in claim 31, wherein said step of controlling includes adjusting an execution frequency of a process attribute controller to increase process stability.

34. A method as claimed in claim 33, wherein said step of adjusting includes comparing a time interval between activations of said process attribute controller with a predetermined time interval threshold.

35. A method as claimed in claim 31, wherein said step of controlling includes selecting an attribute controller for adjusting one of a related: setpoint, deadband and execution frequency.

36. A method as claimed in claim 35, wherein said step of selecting includes determining a number of errors an attribute controller yields, each error being a function of process measurement data related to the attribute controller, a setpoint and deadband related to the attribute controller.

37. A method as claimed in claim 31, wherein said step of controlling includes remedying, without requiring process operator intervention, an alarm activating condition of the coal drying process for each alarm activated wherein said alarm requires timely action affecting said alarm activating condition.

38. A method as claimed in claim 31, wherein said step of controlling includes collecting coal drying process related data for training of said learning unit.

39. A method as claimed in claim 31, wherein said step of obtaining includes selecting said second data cluster such that a value of performance target data related to said second data cluster is within a predetermined range of a corresponding value of performance target data related to said first data cluster by a predetermined function.

40. A method, as claimed in claim 31, wherein:

said step of controlling includes monitoring an input by a process operator for determining whether the input effectively addresses an alarm condition.

41. A coal drying control processing method comprising the steps of:

controlling a coal drying process in real time;

supplying a data cluster to said controlling step, said data cluster derived from an output of a learning unit;

wherein said step of supplying includes a first filtering of said data cluster prior to becoming accessible for use in said step of controlling and a second filtering of said data cluster after termination use in said controlling step, wherein said first filtering includes applying heuristic rules to said data cluster.

42. A coal drying control processing method comprising the steps of;

controlling a coal drying process in real time;

supplying a data cluster to said controlling step, said data cluster derived from an output of a learning unit;

wherein said step of supplying includes a first filtering of said data cluster prior to becoming accessible for use in said step of controlling and a second filtering of said data cluster after termination of use in said controlling step, wherein said second filtering includes preparing an air stability measurement, related to said data cluster, with a predetermined threshold, the comparison used in determining whether said data cluster is to become inaccessible for further use in said step of controlling.

43. A method as claimed in claim 42, wherein the error stability measurement is a function of a deviation of at least one process attribute from a related setpoint.

44. A coal drying control processing method comprising the steps of:

controlling a coal drying process in real time;

supplying a data cluster to said controlling step, said data cluster derived from an output of a learning unit;

wherein said step of supplying includes a first filtering of said data cluster prior to becoming accessible for use in said step of controlling and a second filtering of said data cluster after termination of use in said controlling step.

45. A coal drying control processing method comprising the steps of:

controlling a coal drying process in real time;

supplying a data cluster to said controlling step, said data cluster derived from an output of a learning unit;

wherein said step of supplying includes a first filtering of said data cluster prior to becoming accessible for use in said stem of controlling and a second filtering of said data cluster after termination of use in said controlling step, wherein said first filtering includes determining confidence prediction data for said data cluster, said confidence prediction data a composite of data obtained from said cold drying process.

46. A coal drying control processing method comprising the steps of:

controlling a coal drying process in real time;

supplying a data cluster to said controlling step, the data cluster derived from an output of a learning unit, the data cluster obtained from a plurality of data clusters by selecting the data cluster such that performance target data related to the data cluster is a function of a previous performance target data being used in said step of controlling;

wherein said performance target data includes at least one of: moisture content of coal to be dried, a dried coal tonnage rate, the percentage of free oxygen in a heat transport gas, a drying chamber temperature and an exhaust fan temperature.

47. An automated control processing method for controlling a process in real time comprising:

supplying control data to a plurality of attribute controllers, each attribute controller used in controlling a related process attribute, each related process attribute having a current operating value;

stabilizing the process being controlled so that a measurement of process stability is within a predetermined acceptable range;

adjusting said control data supplied to a first attribute controller of said plurality of attribute controllers for controlling a first process attribute, said control data including a deadband and a setpoint;

wherein said step of adjusting includes:
(A1) obtaining a direction for shifting said setpoint toward a current operating value for said first process attribute;
(A2) performing at least one of: shifting said setpoint in said direction and shifting said deadband in said direction.

48. A method, as claimed in claim 47, wherein:

said first process attribute controller controls one of: free oxygen within a heat transport gas, a drying chamber temperature, a deck pressure differential and an exhaust fan temperature.

49. A method as claimed in claim 47, wherein said measurement of process stability is a function of at least one of a measurement of a process attribute and a measurement of a characteristic of a product produced by the process.

50. A method as claimed in claim 47, wherein said step of adjusting includes selecting said first attribute controller to have its related control data adjusted, wherein an ordering of one or more attribute controller errors is utilized.

51. A method as claimed in claim 50, wherein each error of said one or more attribute controller errors is a function of the deviation of a setpoint from a measurement of a process attribute related to the setpoint.

52. A control processing method comprising the steps of:

providing access to a stored plurality of data clusters, each data cluster for providing process control data to a process manager for controlling a process, each data cluster related to:
(A1) performance target data for specifying target values for one or more processing characteristics of the process;
(A2) applicability data for specifying when the data cluster is applicable for use by the process manager, said applicability data including data related to a measurement of one or more process influencing factors having an uncontrolled variation that influences the process sufficiently so that the process is controlled to accommodate the uncontrolled variation;

entering a first data cluster, related to first performance target data, into said stored plurality of data clusters, said step of entering including associating said first data cluster with a process commencing data cluster contained in said stored plurality of data clusters, said process commencing data cluster used for commencing the process, and said process commencing data cluster being related to a second performance target data, wherein said first and second performance target data have only differences that are inconsequential to a controlling of the process;

accessing said first data cluster from said stored plurality of data clusters for controlling the process, said step of accessing including determining whether a data cluster for obtaining process control data immediately previously to said first data cluster is said process commencing data cluster.

53. An apparatus for controlling a coal drying process comprising:

supervisor means for determining process control data used in controlling the coal drying process;

learning means for:
(a) learning at least a first process relationship using;
  i) first data, output by said supervisor means, for one or more process control parameters, and
  ii) second data related to at least a first process influencing factor, said first process influencing factor has an uncontrolled variation that influences the coal drying process sufficiently so that the coal drying process is controlled to accommodate the uncontrolled variation; and
(b) outputting learned data relating to said first process relationship;

library means for providing access to a plurality of data clusters having process control data, a first data cluster in said plurality of data clusters is:
(a) generated using said learned data, and
(b) accessed by said supervisor means for obtaining process control data;

filter means for accessing said first data cluster by said supervisor means, said filter means using at least a first measurement for said first process influencing factor.

54. An apparatus, as claimed in claim 53, wherein:

said first data cluster includes process control parameter data for controlling the coal drying process and applicability data for determining when said process control parameter data is applicable for controlling the coal drying process, said applicability data having a value for said first substantially uncontrollable process influencing factor.

55. An apparatus, as claimed in claim 53, wherein:

said supervisor means includes tuning means for modifying control data used by a process attribute controller in controlling a process attribute, said tuning means provides for at least one of:
(a) shifting a setpoint for the process attribute toward a current measurement of the process attribute;
(b) changing a time interval relating to a frequency of activation of the process attribute controller.

56. An apparatus, as claimed in claim 55, wherein:

the process attribute is one of: free oxygen content of a heat transport gas, a drying chamber temperature, a deck pressure differential and an exhaust fan temperature.

57. An apparatus, as claimed in claim 53, wherein:

said supervisor means further includes an alarm processing means for detecting at least one of: (a) a process measurement outside of a predetermined bound, and (b) a trend in process control related data different from a predetermined expected trend.

58. An apparatus, as claimed in claim 53, wherein:

said supervisor means further includes an alarm processing means for alleviating at least one alarm condition without requiring manual intervention.

59. An apparatus, as claimed in claim 53, wherein:

said supervisor means includes an object-oriented knowledge base for storing at least one of: (a) process data related to a process attribute measurement, and (b) alarm data.

60. An apparatus, as claimed in claim 53, wherein:

said library means includes an access means for supplying a data cluster from said plurality of data clusters to said supervisor means, said access means determining when to provide said supervisor means with a data cluster by monitoring process related data output by said supervisor means.

61. An apparatus, as claimed in claim 53, wherein:

said learning means includes a neural net for learning said at least one relationship between said first and second data.

62. An apparatus, as claimed in claim 53, wherein:

said filter means includes means for determining a performance related measurement for said first data cluster, said performance related measurement related to at least one of the following for a process attribute:
  (a) a number of times the process attribute is detected as deviating from a related setpoint by a predetermined amount;
  (b) a size of a process attribute deviation from a related setpoint;
  (c) a deadband.

63. An apparatus, as claimed in claim 62, wherein said first data cluster is accessed by said supervisor means only when said performance related measurement is within a predetermined range.

64. An apparatus, as claimed in claim 53, wherein:

said filter means includes means for comparing applicability data, related to said first data cluster, for said first process influencing factor with data ranges determined using measurements of said first process influencing factor.

65. An apparatus, as claimed in claim 53, further including a generating/filtering means for receiving said learned data and providing data clusters as input to said library means, said generating/filtering means comparing said learned data with predetermined data related to previous coal drying processing.

66. An apparatus for controlling a process comprising:

manager means for using process control data in controlling the process;

learning means for:
  (A1) learning at least a first process relationship between:
    (i) first data, derived from output by the process related to one or more process control parameters, and
    (ii) second data related to at least a first process influencing factor, said first process influencing factor has an uncontrolled variation that influences the process sufficiently so that the process is controlled to accommodate the uncontrolled variation; and
  (A2) outputting learned data related to said first process relationship;

access means for supplying a first data cluster having process control data to said manager means, said first data cluster generated from the output learned data, said access means including filter means for determining access by said manager means to said first data cluster, said filter means using at least a measurement of said first process influencing factor in determining access to said first data cluster.

67. An apparatus as claimed in claim 66, further including repository means for storing said first data cluster as one of a plurality of data clusters, each data cluster having process control data for said manager means when supplied by said access means.

68. An apparatus as claimed in claim 66, wherein said manager means includes an expert system means for processing one of: process alarm rules and process adjusting rules.

69. An automated control processing method for controlling a process in real time comprising:

activating each attribute controller of a plurality of attribute controllers, each said attribute controller used in controlling the process, each said attribute controller having an activation frequency or execution frequency for determining a time interval between successive activations of the attribute controller;

stabilizing the process being controlled so that a measurement of process stability for the process is within a predetermined acceptable range;

adjusting a first execution frequency for a first attribute controller of said plurality of controllers wherein said step of adjusting includes:
  (A1) determining an execution frequency increment for adjusting said first execution frequency;
  (A2) adding said execution frequency increment to said first execution frequency.

70. A method, as claimed in claim 69, wherein:

said first attribute controller controls one of: free oxygen within a heat transport gas, a drying chamber temperature, a deck pressure differential and an exhaust fan temperature.

71. An automated control processing method comprising the steps of:

conducting a process which is controlled as the process is performed;

providing a stored plurality of data clusters wherein each data cluster of said stored plurality of data clusters is used in controlling the process;

accessing a first data cluster of said stored plurality of data clusters by a process manager for controlling the process;

replacing access of said first data cluster by the process manager with access to a second data cluster of said stored plurality of data clusters for controlling the process;

post-filtering said stored plurality of data clusters for retaining said first data cluster in said stored plurality of data clusters for a subsequent step of accessing by the process manager, said post-filtering including determining whether the process manager provides acceptable performance in controlling the process during said step of accessing.

* * * * *